US012162586B2

(12) United States Patent
DeHaan

(10) Patent No.: US 12,162,586 B2
(45) Date of Patent: Dec. 10, 2024

(54) SELECTIVELY ENGAGEABLE DETENT SYSTEM FOR AIRCRAFT OPERATION

(71) Applicant: Reliable Robotics Corporation, Mountain View, CA (US)

(72) Inventor: David DeHaan, San Jose, CA (US)

(73) Assignee: RELIABLE ROBOTICS CORPORATION, Mountain View, CA (US)

(*) Notice: Subject to any disclaimer, the term of this patent is extended or adjusted under 35 U.S.C. 154(b) by 15 days.

(21) Appl. No.: 18/097,109

(22) Filed: Jan. 13, 2023

(65) Prior Publication Data
US 2024/0239475 A1 Jul. 18, 2024

(51) Int. Cl.
*B64C 13/04* (2006.01)
*B64C 13/14* (2006.01)
*B64C 39/02* (2023.01)
*G05D 1/00* (2006.01)

(52) U.S. Cl.
CPC ........... *B64C 13/042* (2018.01); *B64C 13/14* (2013.01); *B64C 39/024* (2013.01); *G05D 1/0016* (2013.01); *B64U 2201/20* (2023.01)

(58) Field of Classification Search
CPC ..... B64C 13/042; B64C 13/14; B64C 39/024; B64C 13/00; B64C 13/04; B64U 2201/20
See application file for complete search history.

(56) References Cited

U.S. PATENT DOCUMENTS

| | | | |
|---|---|---|---|
| 4,012,015 A | 3/1977 | Nelson et al. | |
| 5,039,037 A | 8/1991 | DeLuca | |
| 5,502,364 A * | 3/1996 | Blechen | G05D 1/0607 318/632 |
| 7,143,984 B2 | 12/2006 | Marjanski | |
| 9,043,050 B2 | 5/2015 | Goodman et al. | |
| 9,121,487 B2 | 9/2015 | De Mars et al. | |
| 9,828,108 B2 * | 11/2017 | Martindale | B64D 43/02 |
| 10,351,225 B2 | 7/2019 | Spoldi et al. | |
| 11,085,391 B2 | 8/2021 | Hunter et al. | |
| 11,199,867 B2 | 12/2021 | Hunter et al. | |
| 11,400,960 B2 | 8/2022 | Curtis | |
| 2022/0258871 A1 | 8/2022 | Long et al. | |
| 2022/0258872 A1 * | 8/2022 | Hedrick | C09D 175/04 |

FOREIGN PATENT DOCUMENTS

| | | |
|---|---|---|
| GB | 2588665 | 5/2021 |
| GB | 2588666 | 5/2021 |

* cited by examiner

*Primary Examiner* — Justin M Benedik
(74) *Attorney, Agent, or Firm* — Brownstein Hyatt Farber Schreck, LLP

(57) ABSTRACT

An aircraft may include a control lever movable along a lever path and configured to control a system of the aircraft, and a selectively engageable detent feature configured to inhibit travel of the control lever and operable in a disengaged configuration in which the control lever is movable along the lever path without restriction by the selectively engageable detent feature, and an engaged configuration in which the selectively engageable detent feature inhibits travel of the control lever at a particular location along the lever path.

20 Claims, 19 Drawing Sheets

SELECTIVELY ENGAGEABLE DETENT SYSTEM FOR AIRCRAFT OPERATION

TECHNICAL FIELD

The present disclosure is generally directed to a system for selectively engaging and disengaging control lever detents during manual and automatic flight modes of an aircraft.

BACKGROUND

Many systems on an aircraft can be operated manually or automatically. For example, manually operated control levers (or other mechanisms) may be used to control engines, propellers, flaps, and/or other systems of an aircraft (or other vehicle). Pilots manipulate these control levers by hand during aircraft operations to control the associated systems. For aircraft that are capable of autonomous flight modes and/or remotely piloted flight, automatic actuation systems may operate the control levers (or directly operate the systems that are controlled by the control levers) instead of human operators or pilots. Control levers may be associated with detent systems that help pilots identify the location of certain predetermined setpoints for a system and help maintain the control lever at a selected setpoint during aircraft operations. For example, detents for a flap control lever may be provided at certain predetermined flap deployment levels (e.g., full flaps, ½ flaps, etc.). Detents for a throttle lever may be provided at an idle condition. During aircraft operations, the detent systems can help a pilot locate certain setpoints by providing a tactile response and can prevent or inhibit the lever from moving into an unwanted state (e.g., moving an engine to an idle condition during flight).

SUMMARY

An aircraft may include a control lever movable along a lever path and configured to control a system of the aircraft during a manual flight mode of the aircraft and during an at least partially autonomous flight mode of the aircraft, a selectively engageable detent feature configured to inhibit travel of the control lever and operable in a disengaged configuration in which the control lever is movable along the lever path without restriction by the selectively engageable detent feature, and an engaged configuration in which the selectively engageable detent feature inhibits travel of the control lever at a particular location along the lever path. The aircraft may also include a flight control system configured to cause a detent actuator to move the selectively engageable detent feature into the engaged configuration for operation of the control lever during the manual flight mode of the aircraft and cause the detent actuator to move the selectively engageable detent feature into the disengaged configuration for operation of the control lever during the at least partially autonomous flight mode of the aircraft.

When moving from the disengaged configuration to the engaged configuration, the selectively engageable detent feature may translate in a first direction transverse to the lever path, thereby moving at least a portion of the selectively engageable detent feature into the lever path to block the control lever at the particular location along the lever path, and when moving from the engaged configuration to the disengaged configuration, the selectively engageable detent feature may translate in a second direction opposite the first direction, thereby removing the selectively engageable detent feature from the lever path.

The aircraft may further include a self-locking detent actuation mechanism configured to translate the selectively engageable detent feature in the first direction and the second direction to engage and disengage the selectively engageable detent feature, respectively, and lock the selectively engageable detent feature in the engaged configuration during the manual flight mode of the aircraft. The detent actuator may include an unactuated state and an actuated state, the detent actuator may be biased in the unactuated state, in the unactuated state, the selectively engageable detent feature may be in the engaged configuration, in the actuated state, the selectively engageable detent feature may be in the disengaged configuration, and in the actuated state, the detent actuator overcomes the bias to move the selectively engageable detent feature to the disengaged configuration. The self-locking detent actuation mechanism may include a mechanical linkage positionable in an over-center configuration, and the selectively engageable detent feature may be locked in the engaged configuration when the mechanical linkage is positioned in the over-center configuration.

During the at least partially autonomous flight mode, the control lever may be movable along an entire lever path. The aircraft may further include a lever actuation system configured to move the control lever along the lever path in response to a command from the flight control system, and the flight control system may be configured to cause the lever actuation system to move the control lever during the at least partially autonomous flight mode in order to control the system of the aircraft in response to an instruction received from a remote operator of the aircraft. The flight control system may be configured to move the selectively engageable detent feature to the disengaged configuration during the at least partially autonomous flight mode in response to an instruction to move the control lever, with the lever actuation system, past the particular location along the lever path.

An input assembly for a vehicle may include a control lever movable along a lever path and configured to control a system of the vehicle, the control lever configured to be moved by a user when the input assembly is operated in a manual operation mode. The input assembly may also include an actuation system configured to move the control lever along the lever path when the input assembly is operated in an automatic operation mode, thereby controlling the system of the vehicle during the automatic operation mode, and a selectively engageable detent feature configured to inhibit travel of the control lever when the selectively engageable detent feature is in an engaged configuration. The input assembly may also include an actuator configured to engage the selectively engageable detent feature for operation of the input assembly in the manual operation mode and disengage the selectively engageable detent feature for operation of the input assembly in the automatic operation mode.

The actuator may have an actuated state and an unactuated state. In the actuated state, the actuator overcomes a biasing spring to disengage the selectively engageable detent feature, and in the unactuated state, the biasing spring engages the selectively engageable detent feature. The input assembly may further include a movable detent assembly, the movable detent assembly may include the selectively engageable detent feature, and the actuator moves the movable detent assembly from a first position in which the selectively engageable detent feature is engaged to a second position in which the selectively engageable detent feature is disengaged. The input assembly may further include a locking mechanism configured to lock the movable detent assembly in the first position during the manual operation mode of the input assembly.

The control lever may be a first control lever, the lever path may be a first lever path, the system of the vehicle may be a first system of the vehicle, the selectively engageable detent feature may be a first selectively engageable detent feature, and the input assembly may further include a second control lever movable along a second lever path and configured to control a second system of the vehicle, and a second selectively engageable detent feature configured to inhibit travel of the second control lever when the second selectively engageable detent feature may be in an engaged configuration. The first and second selectively engageable detent features may be defined by a unitary detent assembly, and the actuator may be configured to translate the unitary detent assembly in a first direction to simultaneously engage the first and second selectively engageable detent features for operation of the input assembly in the manual operation mode, and translate the unitary detent assembly in a second direction opposite the first direction to simultaneously disengage the first and second selectively engageable detent features for operation of the input assembly in the automatic operation mode. Movement of the control lever along the lever path may control a thrust of the vehicle.

A throttle quadrant may include a base structure, a thrust control lever coupled to the base structure and movable along a first lever path, a flight control surface lever coupled to the base structure and movable along a second lever path, and a movable detent assembly movable between an engaged position and a disengaged position. The movable detent assembly may include a first support member, a second support member, a first detent feature extending from the first support member, the first detent feature positioned in the first lever path to block the thrust control lever at a particular location along the first lever path when the movable detent assembly is in the engaged position, and not positioned in the first lever path when the movable detent assembly is in the disengaged position. The movable detent assembly may further include a second detent feature extending from the second support member, the second detent feature positioned in the second lever path to block the flight control surface lever at a particular location along the second lever path when the movable detent assembly is in the engaged position, and not positioned in the second lever path when the movable detent assembly is in the disengaged position. The throttle quadrant may further include an actuator configured to move the movable detent assembly between the engaged position the disengaged position.

The movable detent assembly may be biased in the engaged position. The actuator may be configured to overcome the bias to move the movable detent assembly to the disengaged position.

The thrust control lever may be configured to control a propeller blade angle, and the flight control surface lever may be configured to control a flap deployment level.

The movable detent assembly may be a unitary structure defining the first support member, the second support member, the first detent feature, and the second detent feature.

The throttle quadrant may further include a self-locking linkage coupling the actuator to the movable detent assembly, the self-locking linkage positionable in an over-center configuration that locks the movable detent assembly in the engaged position when the actuator is in an unactuated state.

Figure 1A:
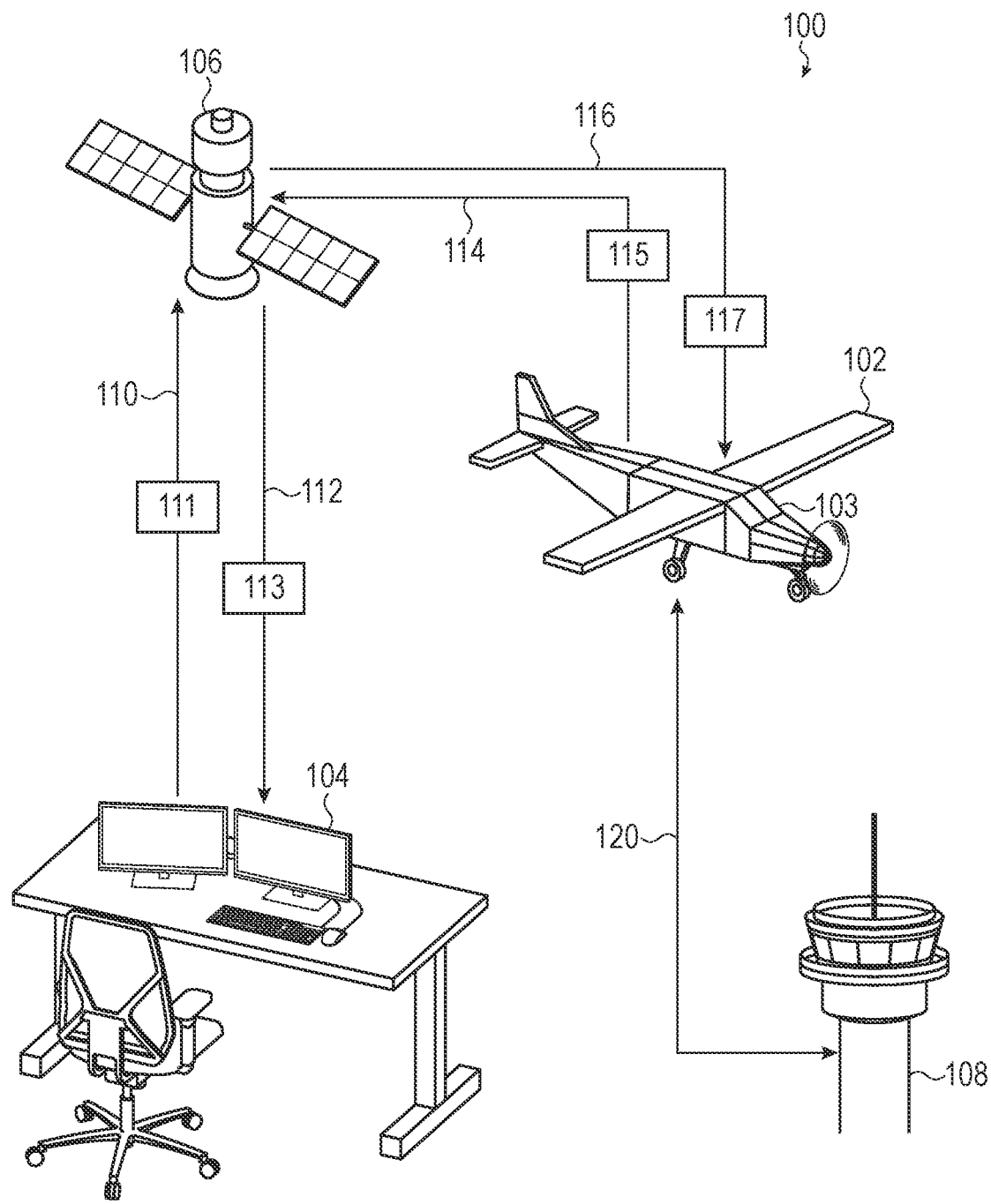
FIG. 1A depicts an example system with an aircraft and a terminal device operated by an operator.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally directed to selectively engageable detent systems for vehicles, such as aircraft. In particular, the aircraft described herein may be operated in both manual and autonomous flight modes. Certain features and systems that are used in manual flight modes, however, may be incompatible with autonomous flight modes. For example, detent systems that mechanically block or inhibit the movement of control levers for convenience and safety during manual flight modes may interfere with the free movement of those control levers during autonomous operation. More specifically, an aircraft that is configured for both manual and autonomous flight modes may have control levers that are manipulated by a pilot, during manual flight modes, to control various systems of the aircraft. Those same levers may be mechanically actuated by an actuation system to control the associated systems during autonomous flight modes. In such cases, the detent systems that are used for manual flight modes would prevent the actuation systems from accessing the full range of control settings for a given system.

Accordingly, described herein are selectively engageable detent systems for an aircraft (or other vehicle). During manual flight modes, the detents may be engaged so that the control levers are blocked or inhibited at the expected setpoints. During autonomous flight modes, or during certain lever actuation conditions during autonomous flight modes, the detents may be disengaged so that the control levers can be operated across the entire lever path without interference from the mechanical detents. Thus, the detents remain functional during manual flight modes, but do not impede control operation during autonomous flight modes.

In some cases, a selectively engageable detent system as described herein includes a movable detent assembly that can be moved between the engaged configuration and the disengaged configuration. In the engaged configuration, detent features, such as tabs, protrude into the lever path of one or more control levers to inhibit travel of the control lever at a particular location. In the disengaged configuration, the movable detent assembly is moved out of the way so that the detent features are no longer in the lever path, thus allowing unimpeded lever travel along the full lever path. The movable detent assembly may be controlled by an actuation system that engages or disengages the detent assembly based on a flight mode.

The selectively engageable detent system may also include a locking system or locking mechanism that locks the movable detent assembly in the engaged position during manual flight modes. Accordingly, the locking system may help prevent accidental disengagement of the detents during manual flight mode (e.g., due to forces applied to the movable detent assembly by the control levers during operation, or to accidental impacts or other forces acting on the detent assembly).

As used herein, autonomous flight modes refer to modes in which one or more systems of an aircraft are controlled by an entity other than an onboard pilot (e.g., the systems are controlled by a flight control system). For example, an autonomous flight mode may include fully autonomous flight, in which one or more computer systems (either onboard the aircraft or remote from the aircraft) and associated control algorithms and actuation systems control all of the systems of the aircraft. An autonomous flight mode may also include semi-autonomous or partially autonomous flight modes, in which one or more computer systems, and associated control algorithms, control some systems of the aircraft (e.g., by actuating the levers or other controls without manual intervention by an onboard operator), while other systems of the aircraft are manually controlled by an onboard pilot. As described herein, whether a selectively engageable detent system is engaged or disengaged during an autonomous flight mode may depend on the particular parameters of that flight mode. For example, in a fully autonomous flight mode, the selectively engageable detent system may be disengaged to allow the autonomous systems to operate the controls throughout their full ranges. (In some cases, as described herein, even in a fully autonomous flight mode the selectively engageable detent system keeps the detents engaged any time the lever is not actually moving past the detent location, which may help prevent the levers from being inadvertently moved to an undesirable position.) In a partially autonomous flight mode in which an onboard pilot or operator is responsible for controlling the aircraft throttle, the selectively engageable detent system may be engaged. In another partially autonomous flight mode in which the aircraft throttle is operated by an actuation system in response to commands from a flight control system and/or a remote operator (e.g., an onboard pilot or operator is not responsible for or is otherwise not manually controlling the aircraft throttle), the selectively engageable detent system may be disengaged (or may be allowed to move to a disengaged configuration while the lever is passing the detent position). For the purposes of this application, fully remotely piloted flight may be understood as autonomous flight, as the actuation systems onboard the aircraft ultimately manipulate the aircraft's systems to fly the aircraft, despite the fact that a human operator is providing the commands to the aircraft (from a remote location).

The examples and embodiments in the instant application are described with respect to an airplane. However, similar systems and techniques may be used to facilitate manual and autonomous operation modes in other types of vehicles. As used herein, a "vehicle" refers to a device or machine capable of transporting a payload. Vehicles include, without limitation, aircraft (e.g., rotorcraft, powered lift, glider, lighter-than-air craft, eVTOL aircraft), spacecraft, watercraft (e.g., boats, ships, hovercraft), land-based vehicles (e.g., cars, trucks, trains, trollies), etc.

These and other aspects of the system are described below with respect to the example embodiments depicted in FIGS. 1-9.

FIG. 1A depicts an example system with an aircraft, which may or may not have an onboard pilot, and a terminal device operated by a remote pilot or other operator. Specifically, FIG. 1A depicts a system 100 that includes an aircraft 102 that may be operated autonomously, piloted by an onboard pilot, remotely piloted, and/or remotely monitored or controlled by a terminal device 104. In some cases, the aircraft 102 may be capable of multiple different flight and/or operational modes, including manual flight modes and autonomous flight modes. The terminal device 104 may also be referred to as a remote terminal, remote control station, ground-based controller, ground station, ground-based facility, or simply a controller. Communications between the terminal device 104 and the aircraft 102 may be managed by a satellite communication system 106 or other type of relay communication system. The aircraft 102, when in certain geographic and/or flight conditions, may communicate with an air traffic control (ATC) facility 108.

As described herein, a satellite-based or satellite-enabled communication scheme may provide several advantages including the ability to operate the aircraft 102 over a potentially large geographical area, which may include regions that are remote from traditional (non-satellite) wireless communication schemes. The satellite-enabled communication scheme may also provide more consistent and reliable communication links that are relatively unaffected by geographic topology, weather, and other factors that may interfere with traditional (non-satellite) wireless communication schemes.

As described herein, the aircraft 102 may be an airplane, rotorcraft, powered lift, glider, lighter-than-air craft, or other current or future category of aircraft (or other vehicle, including, without limitation, land- or water-based vehicles). The aircraft 102 may be adapted for cargo or non-passenger service or, alternatively, may be adapted to carry one or more human passengers or both human and cargo service. While the following examples are directed to an aircraft that is both able to be remotely operated and also adapted for manual flight by an on-board human pilot, the same or similar techniques may be applied to other types of aircraft including, without limitation, remote-controlled aircraft systems or drones that do not have a remote pilot or operator. As described herein, the aircraft 102 may be configured for (or may be modified or retrofitted to enable) fully autonomous, semi-autonomous, and/or manually-operated flight modes, and may be configured for uncrewed flight, remotely operated or monitored flight, or crewed flight. As described above, the systems and techniques described herein may be used to facilitate manual and autonomous operation modes in vehicles other than aircraft. In such cases, the vehicles may be configured for fully autonomous, semi-autonomous, and/or manually-operated modes. For example, in the case of a boat, the boat may be configured for (or may be modified or retrofitted to enable) fully autonomous, semi-autonomous, and/or manually-operated modes, and may be configured for unmanned operations, remotely operated or monitored driving, or manual operation (e.g., by an on-board operator).

Figure 1B:
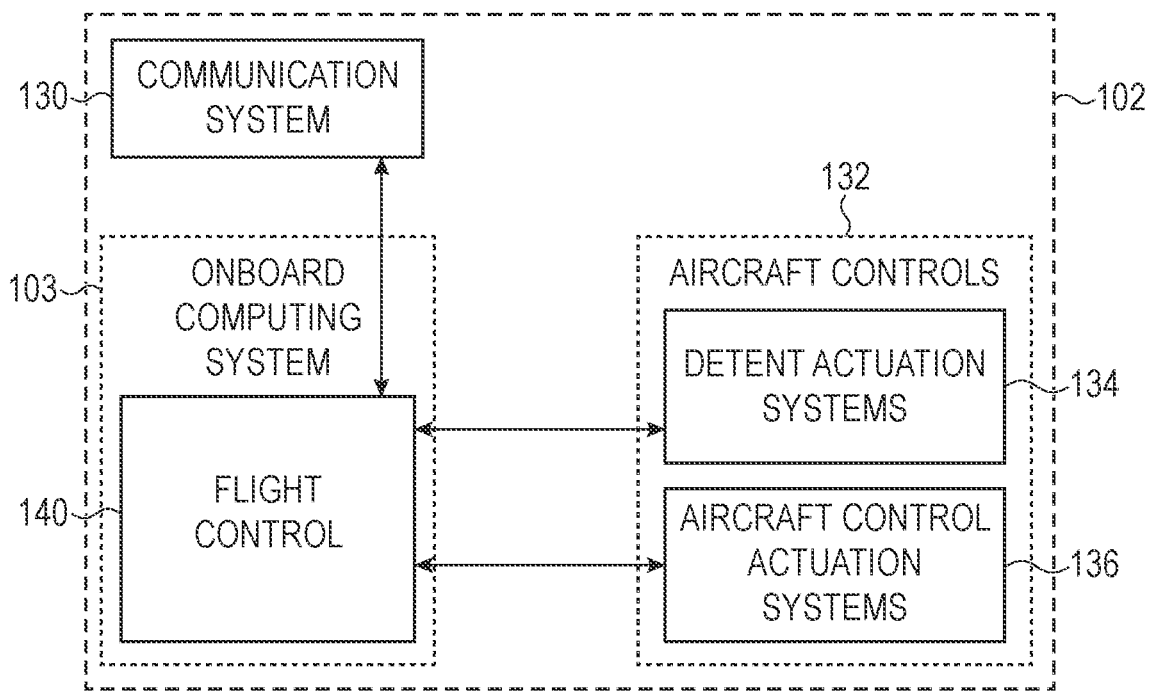
FIG. 1B depicts a schematic representation of systems of an aircraft.

In the present example, the aircraft 102 is a fixed wing powered airplane having aircraft controls that may allow a pilot to manually fly or otherwise operate the aircraft. The aircraft 102 has also been adapted for uncrewed flight in which an on-board pilot is not required. The aircraft 102 is equipped with an on-board computing system 103 which may instantiate a flight control system 140 (FIG. 1B). The on-board computing system 103 and/or the flight control system 140 are configured to operate the propulsion system and various flight control surfaces of the aircraft 102 such as ailerons, an elevator, a rudder, flaps, spoilers, slats, and air brakes.

The on-board computing system 103 (and/or the flight control system 140) may also be configured to control the aircraft propulsion system including, without limitation, piston propeller engines, turboprop engines, turbojet engines, turbofan engines, or ramjet engines. The on-board computing system 103 may also be adapted to control ground or land-based operations including taxiing, parking, and other pre-flight and post-flight maneuvers as well as operate various subsystems including, for example, an auxiliary power unit, cabin environmental controls, fuel system controls, anti-icing equipment, and security systems.

The on-board computing system 103 and/or the flight control system 140 may control the various systems of the aircraft either through motorized or adapted versions of human operated controls, through dedicated control mechanisms, or a combination of the two. In some cases, motorized or other mechanically automated systems may provide inputs to the same controls that a user manipulates during manual flight operations (e.g., a motor may move the same throttle lever that a human would move in order to control the aircraft engines).

In some cases, the aircraft 102 is equipped with redundant electro-mechanical systems for each control operation and may include various other systems to ensure safe and reliable operation of the aircraft. The on-board computing system 103 may also be operably coupled to various sensors including, without limitation, control position sensors, airspeed sensors, temperature sensors, altimeters, global positioning system (GPS) sensors, accelerometers, tilt sensors, radar sensors, LiDAR sensors, and cameras.

Each of the subsystems operated on board the aircraft 102 may be relayed to the terminal device 104 by one or more communication channels or systems. In the present example, the aircraft 102 relays signals to the terminal device 104 via a satellite communication system 106. Specifically, data may be transmitted from the aircraft 102 to the satellite communication system 106 via an uplink channel 114, which may transmit uplink data packets 115. Similarly, data may be received from the satellite communication system 106 via a downlink channel 116, which may transmit downlink data packets 117. The uplink channel 114 and downlink channel 116 may be operated by an on-board transceiver configured to conduct wireless communications with the satellite using an established procedure and frequency band. In some cases, the uplink channel 114 and downlink channel 116 are operated over a common or shared network layer, data link layer, and/or physical communication layer. The transceiver may be adapted to conduct Ka-band communications (26-40 GHZ), Ku-band communications (12-18 GHz), X-band communications (8-12 GHZ), C-band communications (4-8 G Hz), S-band communications (2-4 GHZ), L-band communications (1-2 GHZ), or other established communication bands.

Similarly, the terminal device 104 may conduct communications with the satellite communication system 106 through an uplink channel 110, which may transmit uplink data packets 111 and a downlink channel 112, which may transmit downlink data packets 113. Similar to the aircraft-side of the satellite communication scheme, the uplink channel and downlink channel may operate over a shared network layer, data link layer, and/or physical communication layer. The terminal device 104 may be operably coupled to a wireless transceiver configured to conduct wireless communications directly with a satellite of the satellite communication system 106. Alternatively, the terminal device 104 may be coupled to the satellite system via a satellite service provider that is operably coupled to the terminal device 104 over a computer network like the internet. For purposes of the current examples and explanation, the satellite communication system 106 may include a terrestrial transmission station, which may be operated by the terminal device 104 or by a third party.

The data communication packets 111, 113, 115, 117 may be generated in accordance with an established communications protocol. For example, the data communication packets 111, 113, 115, 117 may be generated in accordance with a Real-time Transport Protocol (RTP), which may include Real Time Communications (RTC) such as WebRTC protocols enabled through a web browser, Real-Time Messaging Protocols (RTMP), Real-Time Streaming Protocols (RTSP), and other similar protocols. Other protocols may include HTTP live streaming (HLS) protocols like Low Latency HLS or other similar streaming communication schemes. These and other protocols may also be broadly characterized as Voice Over Internet Protocol (VOIP) in which analog voice communications are converted to digital data objects (e.g., data communication packets 111, 113, 115, 117) and transported via an Internet Protocol (IP) communication system. While framed or packeted communication schemes may be used, it is not necessary to use either framed or IP communication schemes for the data communication packets 111, 113, 115, 117.

The system 100 may utilize the same communication channels (uplink channels 110, 114 and downlink channels 112, 116) for transmitting flight control information, sensor readings, images, video feeds, or perform other data exchanges between the terminal device 104 and the aircraft 102. In some cases, some or all of these data exchanges are performed on a separate communication channel that is routed through the satellite communication system 106. If the aircraft is predicted to be in reliable communication using another wireless communication network, some or all of the above-referenced data exchanges or voice communications may be, at least temporarily, conducted through another non-satellite wireless communication network.

As discussed previously, one advantage to using a satellite-based communication scheme or system 100 depicted in FIG. 1A is that reliable operation of the aircraft 102 may be provided largely independent of geographic topology or ground conditions that could otherwise interfere with other ground-based communication schemes. The system 100 also enables the terminal device 104 and remote pilot or operator to be located very remote from the aircraft 102 with little or no degradation in the system performance. The system 100 of FIG. 1A may alternatively include a non-satellite communication system. Generally, the depicted satellite communication system 106 may represent a more general remote communication system that includes both or either satellite- or non-satellite-based communication systems. Specifically, element 106 may represent a more general relay communication system that includes primarily ground-based communication hardware and is adapted to communicate with the aircraft 102 using a non-satellite wireless communication system.

FIG. 1B is a schematic representation of the aircraft 102, illustrating various systems that work together to provide the selectively engageable detent functionality described herein. The aircraft 102 includes a communication system 130, which may be used to manage communications between the aircraft 102 and a remote pilot or other operator (e.g., using a terminal device 104 at a terrestrial control station, as shown in FIG. 1A), or another remote source of flight control commands (e.g., a remote autonomous flight controller). In some cases, the on-board computing system 103 includes components and/or provides functions of the communication system 130. For example, the on-board computing system 103 may include one or more transceivers that send and/or receive communications (e.g., via downlink channel 116, uplink channel 114, RF-communication channel 120, and the like) between the aircraft 102 and other entities (e.g., a terminal device 104 of a remote operator, an air-traffic control tower, etc.).

Figure 9:
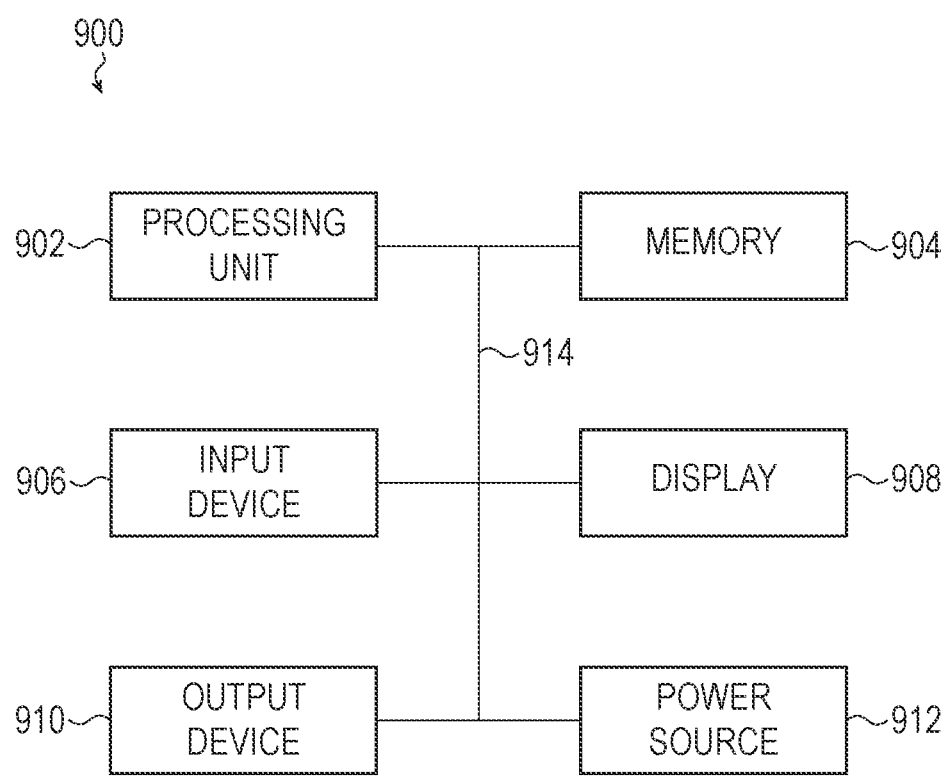
FIG. 9 depicts an example electronic device.

The aircraft 102 may also include a flight control system 140, which may be instantiated by an on-board computing system 103. FIG. 9 illustrates an example electronic device that may correspond to the computing system 103 and that may instantiate the flight control system 140.

The flight control system 140 may receive communications from the communication system 130 (e.g., autonomous flight parameters, remotely generated piloting instructions, etc.), determine operations to perform in response to the received communications, and, responsive to the determinations, transmit signals to the appropriate systems of the aircraft to execute the operations. The flight control system 140 may also control autonomous flight operations selected by an onboard crewmember and control the aircraft's systems to execute the autonomous operations (e.g., autothrottle operations, autopilot operations, etc.).

The aircraft 102 may also include aircraft controls 132. The aircraft controls 132 may include the controls and/or control systems that are used to provide inputs to the aircraft 102 to facilitate flight. The aircraft controls 132 may include systems for controlling the propulsion system and various flight control surfaces of the aircraft 102 such as ailerons, an elevator, a rudder, flaps, spoilers, slats, air brakes, or the like. The aircraft controls 132 may include the manually operated controls that a pilot manipulates during manual flight, including, without limitation, control levers (e.g., throttle control, fuel mixture control, propeller blade angle, flap positions, elevator trim, etc.), rudder pedals, one or more yokes, and the like.

The aircraft controls 132 may also include or operate in conjunction with detent actuation systems 134 and aircraft control actuation systems 136. The aircraft control actuation systems 136 receive aircraft control input commands from the flight control system 140 and operate the relevant aircraft controls to execute the received commands. The aircraft control actuation systems 136 facilitate autonomous flight modes or operations, such as when the aircraft is being flown by a remote pilot, or when the aircraft is being fully or partially controlled by the flight control system 140.

The aircraft control actuation systems 136 may include components such as servomotors and actuators, and associated control units, that move either the manual control components of an aircraft or the actual aircraft systems associated with those control components. For example, an aircraft control actuation system for an engine control system may include a motor that moves the engine control mechanism (e.g., a lever, knob, valve, flow restrictor, etc.) to a commanded setpoint, thereby controlling an engine parameter of the aircraft. As another example, an aircraft control actuation system for wing flaps may include an actuator that moves the wing flaps directly.

The detent actuation systems 134 receive detent control commands from the flight control system 140 and operate one or more detent systems to selectively engage and disengage detent features for various control levers or other aircraft control mechanisms. The detent actuation systems 134 may include detent features that inhibit motion or travel of control components such as flight control levers (e.g., physical components that can be positioned in a lever path to block or inhibit motion of the lever along the lever path), as well as motors, actuators, and associated control units, that control the positioning and/or configuration of the detent features.

The flight control system 140 may determine whether detent features for any given aircraft control should be in an engaged configuration or a disengaged configuration at a given time and provide a signal to the associated selectively engageable detent system to control the detent features accordingly. The determination of whether a selectively engageable detent system should be engaged or disengaged may be based at least in part on whether the associated aircraft system is under manual control (e.g., being controlled by an onboard pilot), or autonomous control (e.g., being controlled by the flight control system 140, which may correspond to onboard autonomous control by the flight control system 140 itself or commands received from a remote human operator). When a system of the aircraft is under manual control, and/or the aircraft is in flight mode in which that system is under manual or under onboard control authority, the selectively engageable detent system may be engaged such that the relevant detent features are operable to inhibit motion of an associated control lever (or other input member or mechanism). When a system is under autonomous control, and/or the aircraft is in flight mode in which that system is under autonomous control or otherwise being controlled by the on-board computing system, the selectively engageable detent system may be disengaged such that the relevant detent features do not inhibit motion of an associated control lever (or other input member).

Figure 2A:
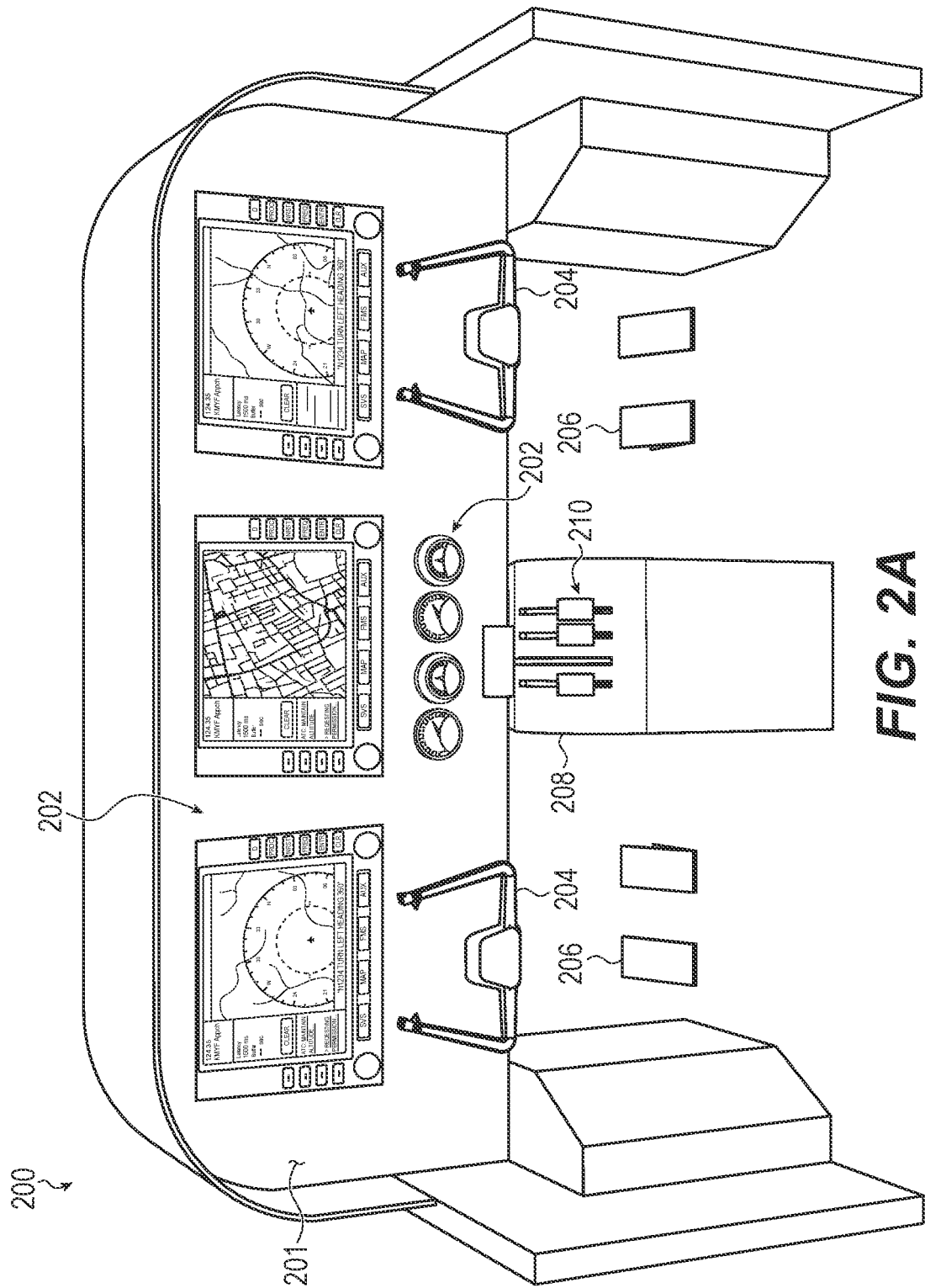
FIG. 2A depicts an example cockpit of an aircraft.

FIG. 2A illustrates a portion of an example cockpit 200 of an aircraft, such as the aircraft 102. The cockpit 200 includes an instrument panel 201 that includes instruments 202. The instruments 202 may include computers, displays, dials, navigation equipment, communications equipment, and the like. The instruments 202 may include or be coupled to the on-board computing system 103 (FIG. 1A). The instruments 202 may also receive inputs from one or more onboard pilots or crewmembers to control various systems of the aircraft. The cockpit 200 may also include various manual input systems for receiving physical inputs from a pilot or crewmember to control one or more aircraft systems. For example, the cockpit 200 may include one or more yokes 204 (or control sticks or other structures). The yokes 204 may control flight control surfaces such as ailerons, elevators, ruddervators, stabilators, or the like. The cockpit 200 may include one or more sets of rudder pedals 206, which may control a rudder of the aircraft (or a ruddervator or other flight control surface).

The cockpit 200 may also include a flight control input assembly 210. The flight control input assembly 210 is conventionally where control levers for the propulsion system of an aircraft (e.g., a throttle control and power condition lever(s)) are positioned, and as such is also referred to as a throttle quadrant 210. The flight control input assembly 210 may include control levers and other input members (e.g., dials, buttons, knobs, etc.) that are manually manipulated by an onboard pilot or crewmember to operate the control systems of the aircraft. The flight control input assembly 210 may include control levers for controlling propulsion systems of the aircraft, flight control surfaces (e.g., flaps, elevator trim, air brakes), landing gear, or other aircraft systems.

Control levers for controlling propulsion systems of an aircraft (e.g., a subset of the control levers that may be in a flight control input assembly 210) may control any function or system that affects the thrust of an aircraft. As used herein, a control lever or control system that controls an aspect of the propulsion system to vary the thrust produced by the propulsion system may be referred to as a thrust control lever or a throttle control lever. A thrust control lever may control different functions of a propulsion system depending on the type of propulsion system used by an aircraft. For example, if the aircraft uses a piston-driven engine with a propeller having a fixed blade angle, a thrust control lever may control a fuel flow rate into the engine. A thrust control lever may also adjust the mixture ratio of air to fuel entering the combustion chamber of the engine. If the aircraft uses a variable-pitch propeller, a thrust control lever may control a blade pitch of the propeller (e.g., the propeller control lever may be referred to as a thrust control lever). In some cases, multiple control levers may be used together to control the thrust of an aircraft, and in such cases, each lever may be understood as a thrust control lever. For example, a turbine engine with a variable pitch propeller may include control levers for engine power as well as propeller blade angle, and each control lever may be used to affect the thrust of the aircraft. Accordingly, each of these levers may be understood as a thrust control lever. In other vehicles, a control lever for controlling the propulsion system of the vehicle may be referred to as a propulsion control lever, and the lever may control any function or system that affects the propulsion of the vehicle (e.g., a blade pitch of a propeller of a boat or ship, a voltage or other signal provided to an electric motor of an electric vehicle, etc.). It will be understood that the control levers may control certain operational parameters, such as fuel flow rate or fuel-air mixture, by providing an input to a mechanical governor or other mechanism that ultimately controls the operational parameter directly.

While the instant application refers to control levers that control certain systems of an aircraft, control levers are merely one example of the various types of input members or mechanisms that may be used to control the systems of a vehicle. For example, vehicle systems may be controlled by pedals, translating shafts, pushrods, dials, sliders, joysticks, wheels, and the like. Any of these types of input members or mechanisms may use selectively engageable detent systems as described herein to selectively engage and disengage detent features in order to inhibit travel or movement of the input members under certain circumstances.

As noted above, the flight control input assembly 210 may include control levers that conventionally include detent systems that help pilots tactilely identify the location of certain predetermined lever positions. For example, thrust control levers may include detents at predetermined thrust levels, such as to prevent a lever from being inadvertently placed in a "no thrust" or an "engine shutdown" position during flight. By way of another example, a thrust control lever for a turbine engine may have a detent to identify the "reverse thrust" position that may be employed following a landing. Flight control surface levers, such as a wing flap control lever, may include detents at predetermined deployment levels (e.g., fully deployed, 50% deployed, etc.). Accordingly, the flight control input assembly 210 may include a selectively engageable detent system that can engage detent features during appropriate flight modes and disengage them during others.

Figure 2B:
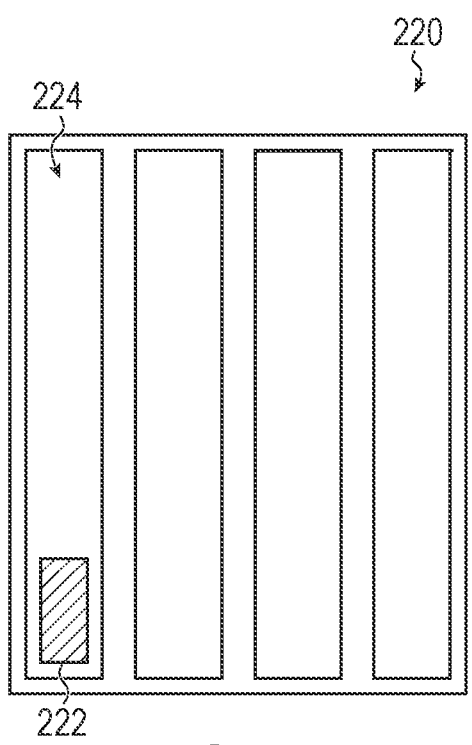
FIGS. 2B-2E depict schematic representations of a selectively engageable detent system for use with an aircraft or other vehicle.
Figure 2C:
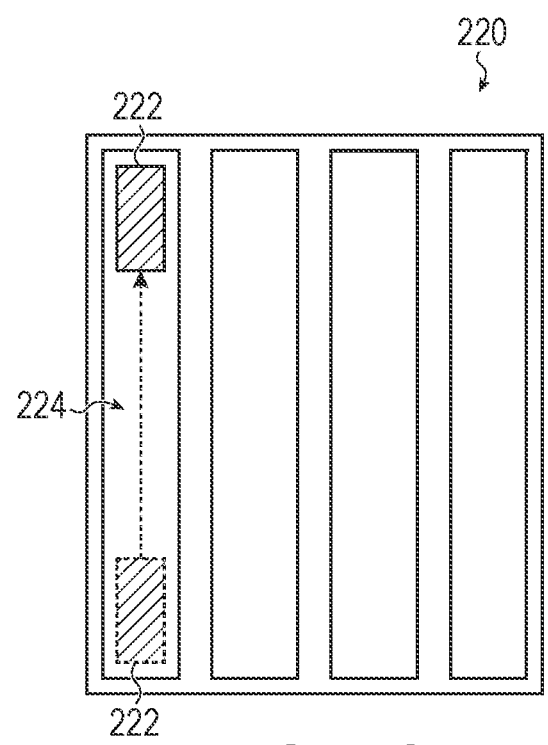

FIGS. 2B-2E illustrate a schematic representation of the operation of a selectively engageable detent system 220. As shown in FIG. 2B, a lever 222 (shown in cross-section) may be configured to travel along a lever path 224. FIG. 2B illustrates the selectively engageable detent system 220 in a disengaged state, in which there are no detent features present in the lever path or otherwise able to block or inhibit travel of the lever 222 along the lever path 224. Thus, as shown in FIG. 2C, the lever 222 may be moved the full distance of the lever path 224 without interference from a detent feature. For example, the lever 222 may have a first unrestricted travel distance that extends the full distance of the lever path 224. Stated another way, when the selectively engageable detent system 220 is disengaged, the distance that the lever 222 can travel along the lever path 224 without restriction by a detent feature is the full length of the lever path 224.

Figure 2D:
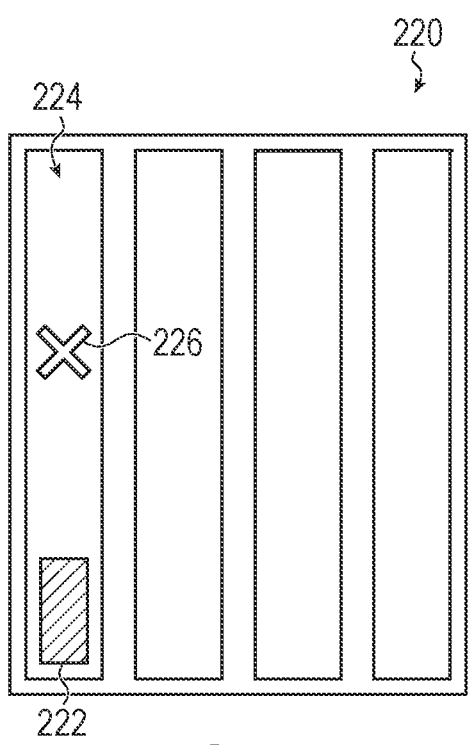
Figure 2E:
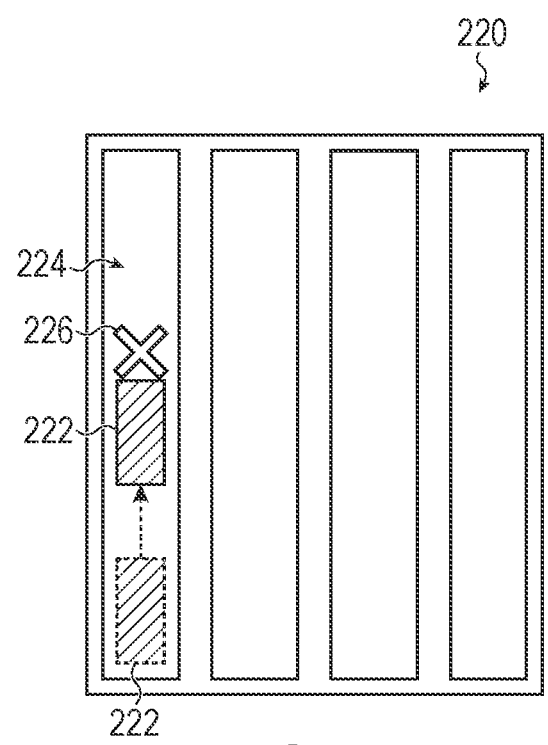

FIG. 2D illustrates the selectively engageable detent system 220 in an engaged state, in which a detent feature 226 is positioned in the lever path 224 or is otherwise configured to inhibit motion of the lever 222 at a particular location in the lever path 224. As shown in FIG. 2E, the detent feature 226 interacts with the lever 222, such as to prevent or inhibit movement of the lever at the position of the detent feature 226. In this configuration, the detent feature restricts the lever 222 to a second unrestricted travel distance that is shorter than the first unrestricted travel distance. Stated another way, when the selectively engageable detent system 220 is engaged, the distance that the lever 222 can travel along the lever path 224 without restriction by a detent feature is a shorter distance and is defined at least in part by a selectively engageable, detent feature blocking the lever travel in at least one direction. Thus, a lever may have a first travel distance when the selectively engageable detent features are disengaged (e.g., a longer travel distance), and a second travel distance (e.g., a shorter travel distance, restricted by the introduction of the detent into the path) when the selectively engageable detent features are engaged.

A detent feature may also be understood as providing a tactile cue to an operator to indicate the position of the lever. Detent features may be overcome by an operator, such as by applying a lateral force to the control lever, actuating a button or other mechanism to temporarily override or disengage the detent feature, or the like. Example configurations of a detent feature such as the detent feature 226 are described herein with respect to FIGS. 3B-6B.

Detent features may inhibit or prevent movement of a lever in one direction along the lever path, or in two directions along the lever path. For example, a unidirectional detent feature may allow a lever to pass the detent feature without impeding the lever when the lever is moved in one direction along the lever path, and then inhibit motion of the lever when the lever is moved in the opposite direction along the lever path. A bidirectional detent feature may inhibit motion of the lever in both directions. Examples of bidirectional and unidirectional detent features are described with respect to FIGS. 3B-3D.

Figure 3A:
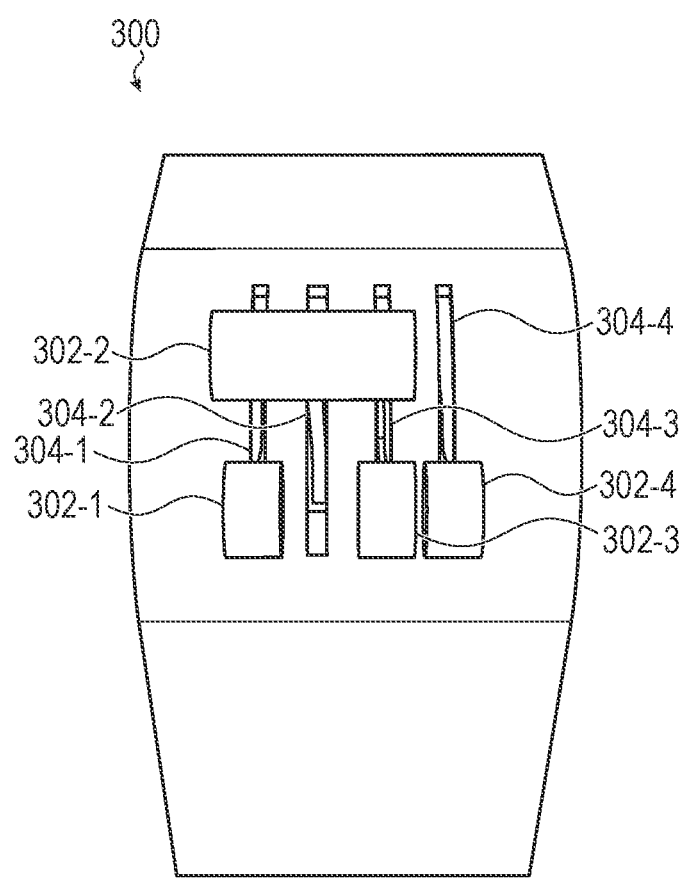
FIG. 3A depicts an example flight control input assembly, or throttle quadrant, for an aircraft.

FIG. 3A illustrates an example flight control input assembly 300 (also referred to as a throttle quadrant) for an aircraft. The flight control input assembly 300 includes control levers 302 (e.g., 302-1-302-4). The control levers 302 may be movable along lever paths 304 (e.g., 304-1-304-4). The control levers 302 are configured to control a system of the aircraft during a manual flight mode and during an at least partially autonomous flight mode. The control levers 302 may be configured to control various aircraft systems, including, but not limited to, a propulsion system (e.g., engines, propellers), wing flaps, and elevators.

While the flight control input assembly 300 is described with respect to an aircraft, it will be understood that a control input assembly in accordance with the instant description may be used for other vehicles as well. For example, where a control input assembly is used in a boat or ship, the control levers may be configured to control systems such as engines, positioning thrusters, trim tabs, ballast tanks, sails, anchor systems, and the like. Where a control input assembly is used in a lighter-than-air aircraft, the control levers may be configured to control systems such as a propulsion system, a buoyancy control system, and the like. Other vehicles, and the systems that are controlled by a control input assembly, are also contemplated. In such cases, the selectively engageable detent systems may be configured to engage and disengage detents at locations that are operationally appropriate for the given vehicle and associated system.

The control levers 302 (or a subset thereof) may be operable in a manual operation mode, in which a pilot, crewmember, or other user manually moves the control levers 302 to control the aircraft systems. The control levers 302 are also operable in an automatic operation mode, in which a lever actuation system (e.g., the actuation system 136, FIG. 1B) moves the control levers 302 (or a subset thereof) along their respective lever paths in response to signals from a control system of the aircraft (e.g., the flight control system 140).

Figure 3B:
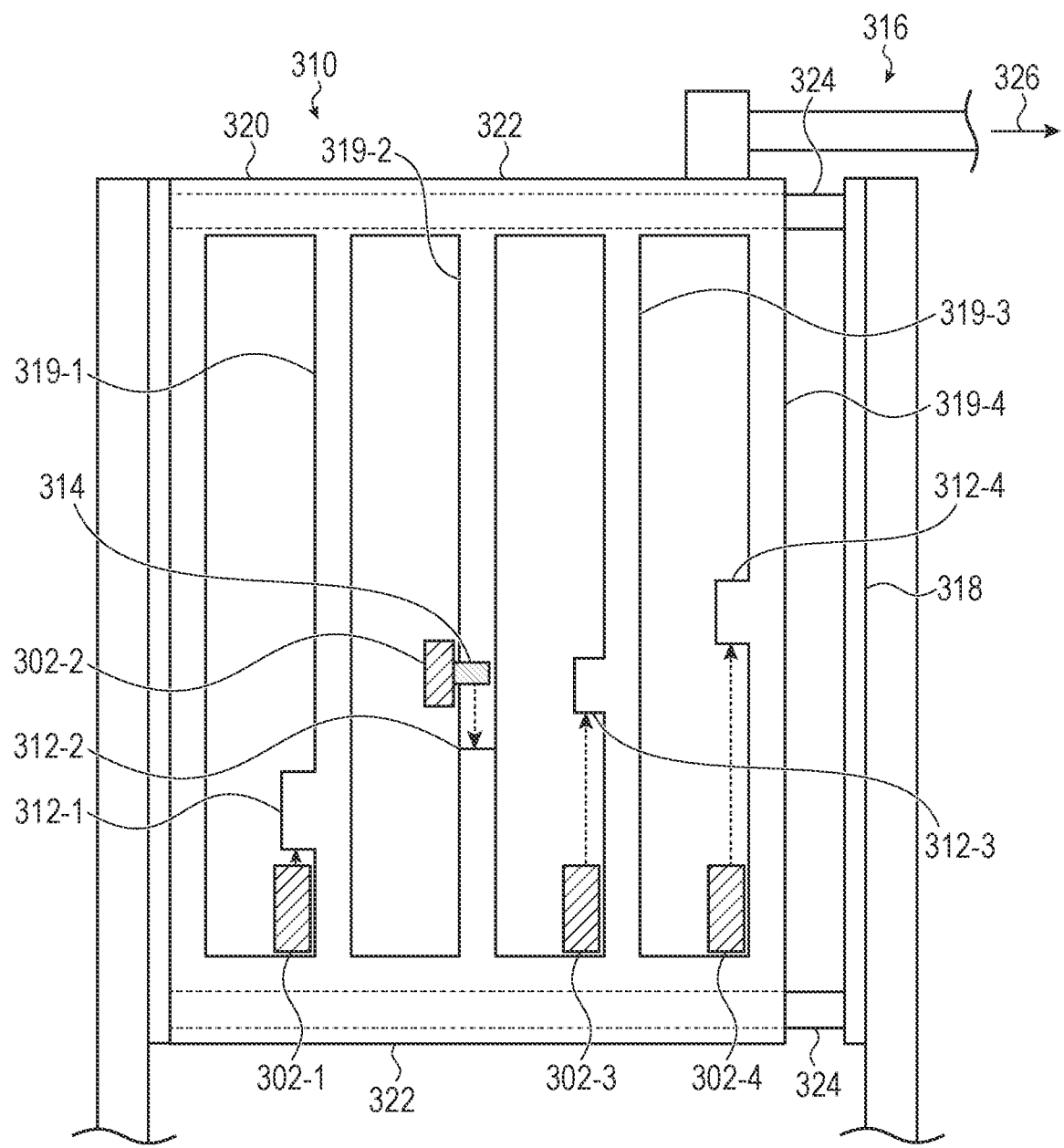
FIGS. 3B-3D depict portions of an example selectively engageable detent system.

FIG. 3B illustrates an example selectively engageable detent system 310 that may be used with the flight control input assembly 300. The selectively engageable detent system includes one or more selectively engageable detent features 312 (e.g., 312-1-312-4) that are configured to inhibit travel of the control levers. The selectively engageable detent system 310 also includes a detent actuation system 316 that is configured to move the selectively engageable detent features 312 between the engaged and disengaged configurations, as described herein.

The selectively engageable detent features 312, and the selectively engageable detent system 310 more broadly, may be operable in an engaged configuration, in which the detent features inhibit travel of the control levers at a particular location along the lever paths, and a disengaged configuration. The selectively engageable detent system 312 may be operated in the engaged configuration when the control levers 302 are operated in the manual operation mode, and in the disengaged configuration when the control levers 302 are operated in the automatic operation mode.

FIG. 3B illustrates the detent features 312 in the engaged configuration. In this example, the detent features 312 are positioned in the lever paths to block or otherwise impede the control levers 302 at a particular location along the lever path. FIG. 3B illustrates example lever translations (indicated by the arrows) and how they may be impeded by the detent features 312.

The particular location of any given detent feature may depend on the type of aircraft system controlled by that lever and the intended purpose of the detent feature. For example, a detent feature for a propeller blade angle lever may inhibit the lever from being moved into a "feather" position, which could result in a loss of thrust during flight. As another example, a detent feature for an engine control lever may inhibit the lever from being moved into a "fuel cutoff" position. As described herein, a pilot may intentionally overcome a detent feature by applying an appropriate force to the lever or manipulating a mechanism, but the detent features can prevent a lever from accidentally being moved into an undesirable or dangerous position, and/or provide a physical reference point for a certain lever position for use during operation of the aircraft.

Figure 3C:
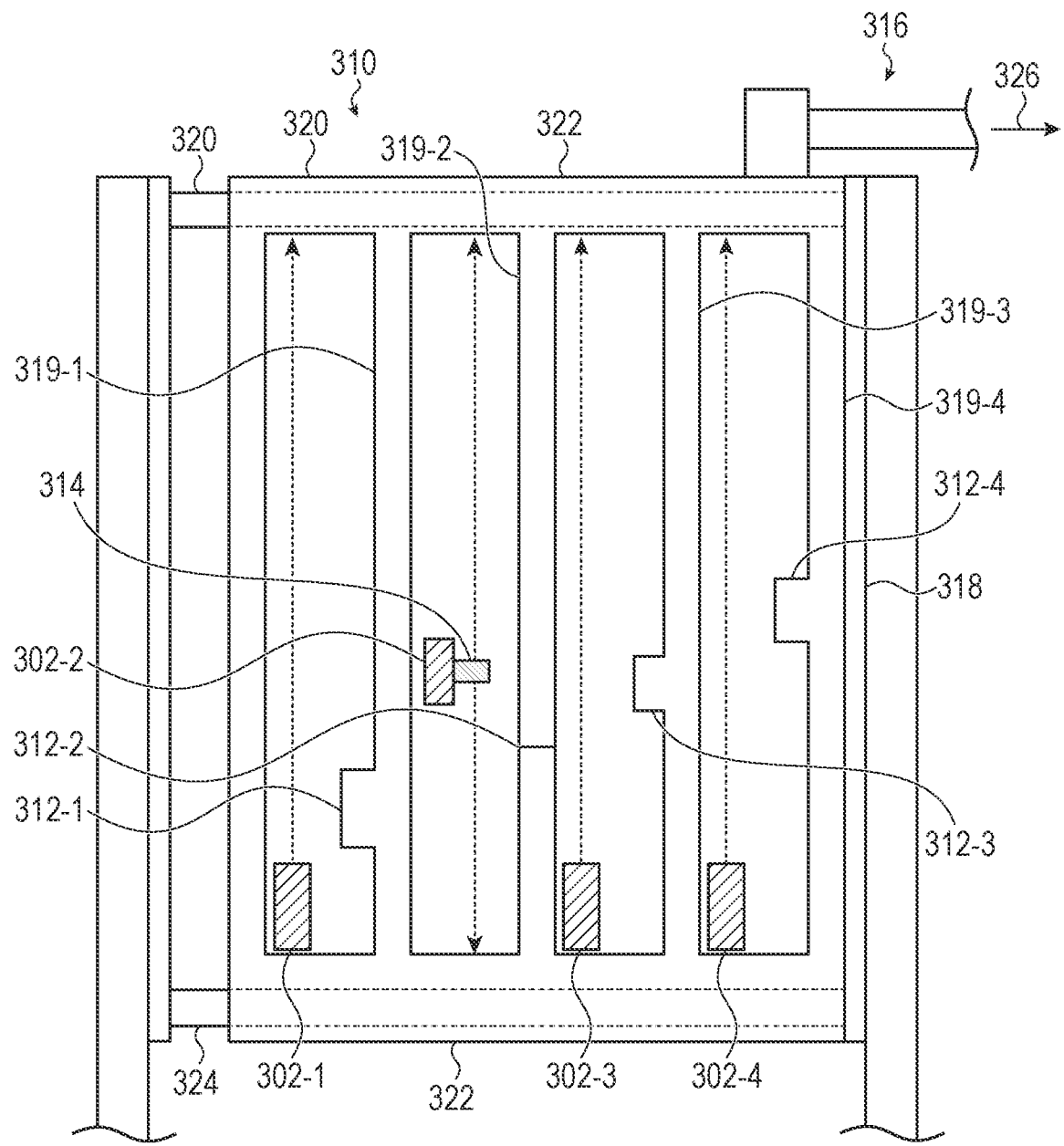

FIGS. 3B and 3C illustrate an example selectively engageable detent system 310 in which multiple detent features 312 are coupled to or otherwise part of a movable detent assembly 320, and which may be moved between the engaged and disengaged configurations as a single structure. As described herein, the movable detent assembly 320 may be biased in the engaged configuration. In some cases, the movable detent assembly 320 may be biased in the disengaged configuration. In either case, the biasing force may be provided by an actuator that provides a biasing force, and/or by a biasing feature (e.g., a spring) that is separate from an actuator. A biasing force may also be provided by other mechanisms, configurations, or interactions. For example, a mechanism may be biased by the force of gravity.

The movable detent assembly 320 may include support members, such as the support members 319 (e.g., 319-1-319-4). The movable detent assembly 320 may also include the detent features 312, which may extend from the support members 319. The movable detent assembly 320 may be configured to move relative to a static member 318. For example, the movable detent assembly 320 may include sleeve members 322 that slide along rails 324 in order to move the movable detent assembly 320 between the engaged and disengaged positions.

The movable detent assembly 320 may be a rigid structure that defines multiple support members 319 and multiple detent features 312. In some cases, the movable detent assembly 320 is a unitary structure, such as a single piece of metal or polymer, that defines the support members 319 and the detent features 312. In some cases, the movable detent assembly 320 may be formed from or include multiple components or members attached to one another. For example, support members 319 (which may define the detent features 312 or have detent features 312 attached thereto) may be attached to sleeve members 322, such as via fasteners, welding, adhesives, or other attachment techniques.

FIG. 3C illustrates the selectively engageable detent system 310 in a disengaged configuration. For example, the detent actuation system 316 has been actuated in order to move the movable detent assembly 320 from the engaged position (FIG. 3B) to the disengaged position (FIG. 3C). as indicated by arrow 326. In this configuration, the detent features 312 have been moved out of the lever paths of the levers 302 (e.g., the features are not positioned in the lever paths), such that the levers are movable along their entire lever paths. As noted, this configuration may be selected when the levers 302 are operated in an automatic mode (e.g., during an at least partially autonomous flight mode), so that the full range of lever positions is available to the control system. In some cases, this configuration may be selected only when the levers 302 are being commanded to pass a detent position during an automatic mode. For example, when the flight control system 140 commands a lever to pass a position where a detent exists, the flight control system 140 may cause the selectively engageable detent system 310 to move to the disengaged configuration to allow the lever to pass. Once the lever is passed the detent position, the flight control system 140 may cause the selectively engageable detent system 310 to move to the engaged position. The temporary disengagement of the detents may help prevent the levers from moving to an undesirable or dangerous position (e.g., from a human input or an actuator-based input). Moreover, the temporary disengagement of the detents during autonomous flight modes may inhibit the levers from moving to an undesirable or dangerous position in the event of a lever actuation system becoming inoperable or otherwise malfunctioning. This may also facilitate the use of simpler actuation systems and/or fewer redundant systems, because maintaining the detents in an engaged position even during autonomous flight modes can serve as an additional layer of safety in the event of malfunctioning or damaged lever actuation systems.

FIGS. 3B-3C illustrate several types of selectively engageable detent features that may be moved between engaged and disengaged configurations by the movable detent assembly 320. For example, detent features 312-1, 312-3, and 312-4 resemble tabs and are moved horizontally into and out of the lever path when engaged and disengaged. For these detent features, a pilot or crewmember may override the detent feature, when operating in a manual mode, by bending, flexing, or otherwise deflecting the lever 302 along a horizontal direction, thereby physically bypassing the detent features.

The detent feature 312-2 may extend vertically into the lever path of the lever 302-2. For example, as shown in FIGS. 3B-3D, the lever 302-2 may include a feature such as a pin 314 that extends from a main portion of the lever 302-2 and is configured to overlap or otherwise engage the detent feature 312-2 when the detent feature 312-2 is in the engaged configuration, and not overlap the detent feature 312-2 when the detent feature 312-2 is in the disengaged configuration.

Figure 3D:
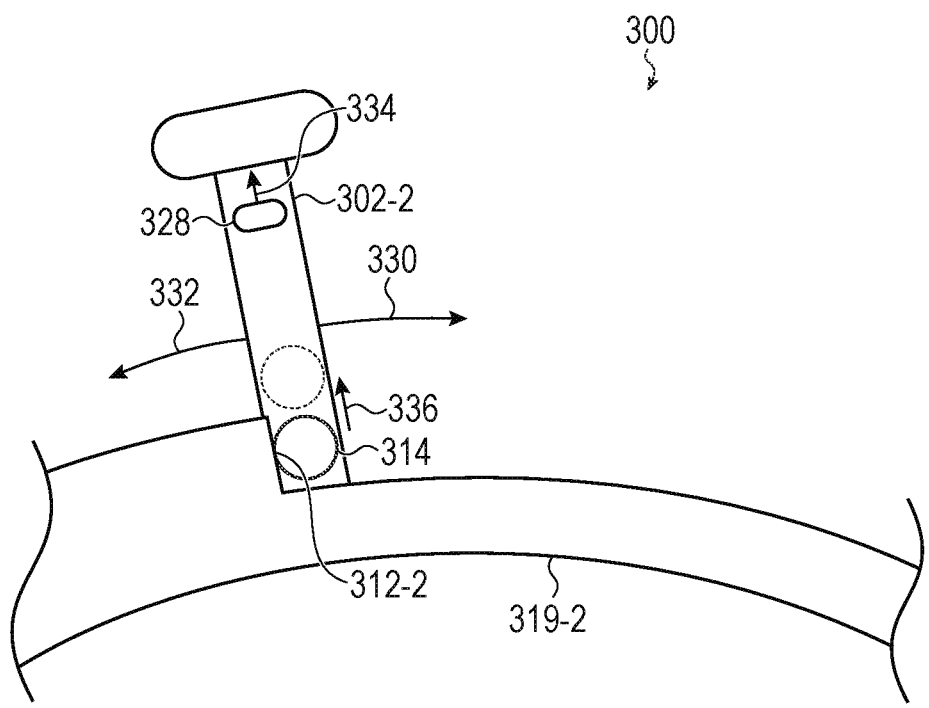

FIG. 3D illustrates a partial side view of the flight control input assembly 300, showing the support member 319-2, the detent feature 312-2, and the lever 302-2. FIG. 3D illustrates the detent feature 312-2 in the engaged configuration. As shown, the detent feature 312-2 is configured to engage the pin 314 to inhibit the lever from moving past a certain point in the direction 332. In this example, the detent feature 312-2 may be manually overcome or bypassed by actuating a release mechanism 328. For example, a pilot or crewmember may actuate the release mechanism 328 by pulling upwards on the release mechanism 328 (indicated by arrow 334), which causes the pin 314 to move upwards (indicated by arrow 336) and out of the way of the detent feature 312-2. (The release mechanism 328 may be mechanically linked to the pin 314 to facilitate the pin disengagement shown in FIG. 3D.) Once the pin 314 is raised or otherwise moved out of the interference path of the detent feature 312-2, the pilot can manually move the lever 302-2 to any desired position. In some cases, the detent feature can be overcome by providing additional force on the lever 302-2. In such cases, the detent feature 312-2 may define a ramped or rounded surface that contacts the pin 314 to inhibit lever motion (and provide a tactile response to the operator), but that ultimately guides the pin 314 out of the way when a sufficient force is applied.

The detent feature 312-2 is an example of a unidirectional detent feature. In particular, even in the engaged configuration, the detent feature 312-2 does not inhibit motion of the lever along the direction 330, but it will inhibit motion of the lever along the direction 332. By contrast, the detent features 312-1, 312-3, and 312-4 are bidirectional, and will inhibit motion of a lever along both directions.

The detent features 312 (and the movable detent assembly 300 more generally) may translate linearly into and out of the lever paths along directions that are transverse (e.g., perpendicular) to the lever path when being moved into the engaged and disengaged configurations. Other configurations are also contemplated, however, such as detent features that rotate into the lever paths or travel along non-linear paths into and out of the lever paths.

While the example selectively engageable detent systems shown in the instant figures include four separate lever paths (and four support members), with each lever path including a single detent feature, this is merely one example configuration, and other configurations are also contemplated depending on the operational parameters of the aircraft (or other vehicle) in which the selectively engageable detent system is incorporated. For example, in some cases, a selectively engageable detent system may include more or fewer lever paths. As another example, in some cases, not every lever path includes a detent feature; in other cases, some or all of the lever paths include multiple detent features. In some cases, selectively engageable detent systems may include multiple independently-actuatable detent assemblies, such that some detent features may be engaged and disengaged independently of others.

As yet another example, a movable detent assembly may have multiple engaged positions (e.g., a first engaged position and a second engaged position), where the different engaged positions correspond to different sets of detents (or differently positioned detents) being engaged. For example, a selectively engageable detent system may move different distances to engage different sets of detent features (e.g., a first distance to engage a first set of detents, and a second distance to engage a second set of detents). As another example, a movable detent assembly may have different sets of detents that extend into a lever path from opposite sides, and moving the movable detent assembly in a first direction engages a first set of detents (e.g., sliding in a set of detents from the left side), and moving the movable detent assembly in a second direction engages a second set of detents (e.g., sliding in a set of detents from the right side). For example, with reference to FIG. 3C, a detent feature may extend from the support member 319-2 into the lever path of the lever 302-3, in addition to the detent feature 312-3 extending into the same lever path from support member 319-3. In this example, in a first engaged position (e.g., corresponding to the movable detent assembly 320 in FIG. 3C being moved fully to the left), the detent feature 312-3 may be positioned in the lever path, while in the second engaged position (e.g., corresponding to the movable detent assembly 320 in FIG. 3C being moved fully to the right), the additional detent feature extending from the support member 319-2 may be positioned in the lever path. In such cases, the disengaged position may correspond to the movable detent assembly 320 positioned in an intermediate position where neither detent feature overlaps the lever path. Other configurations of selectively engageable detent systems with multiple engaged positions are also contemplated. Also, the different detent positions of such a system may correspond to (e.g., be used during) different modes of flight. For example, one engaged position may correspond to a vertical flight mode (e.g., vertical take-off, vertical landing, hover), while another corresponds to a horizontal flight mode. As another example, one engaged position may correspond to an automatic flight mode, while another corresponds to a manual flight mode.

Figure 4A:
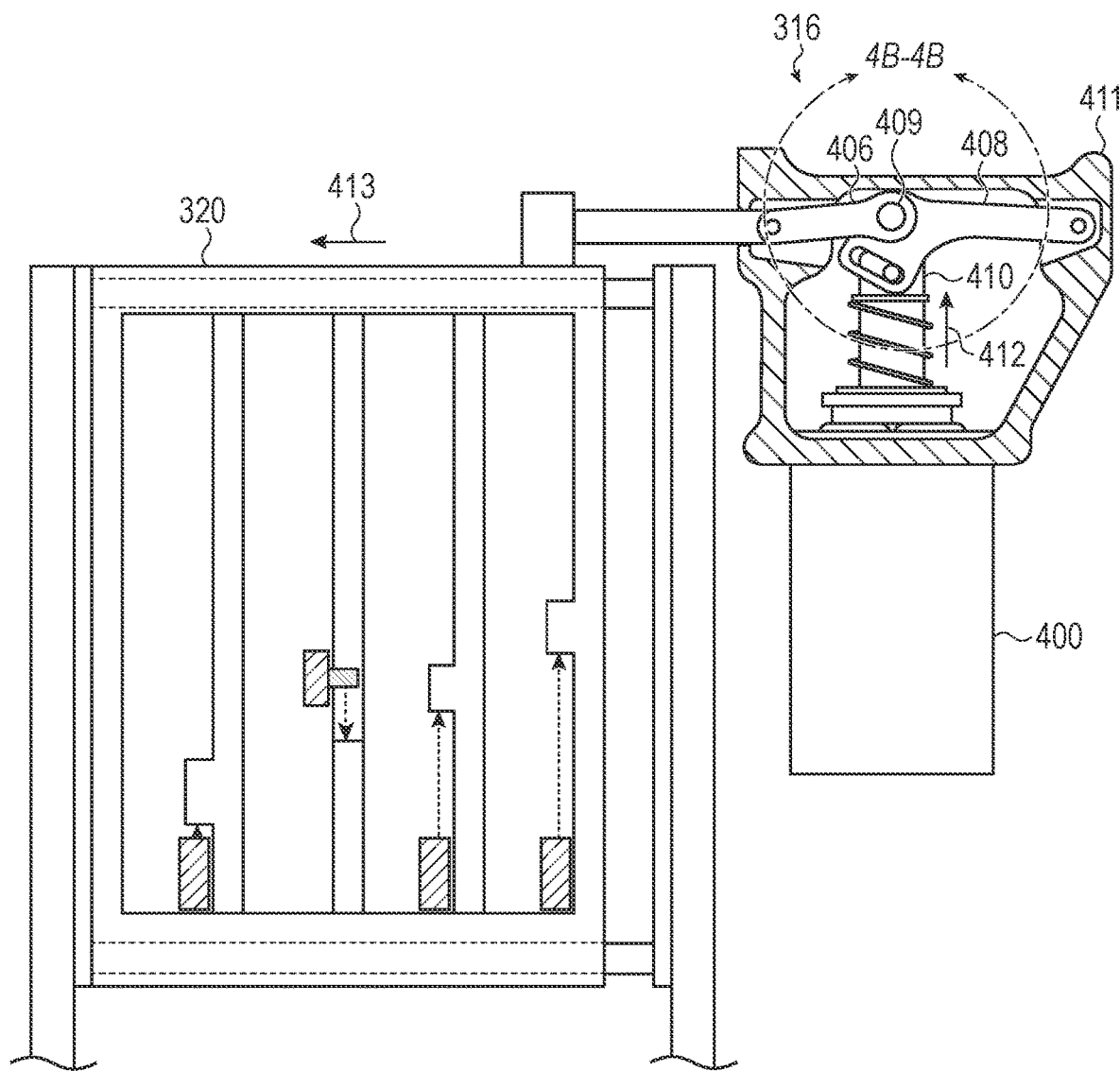
FIGS. 4A-4C depict a selectively engageable detent system with an example actuation system.
Figure 4B:
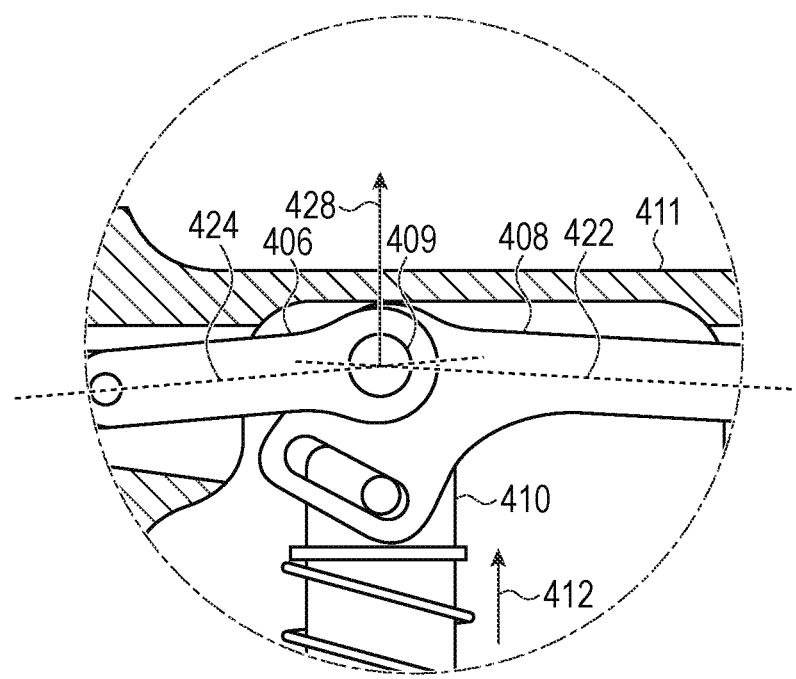
Figure 4C:
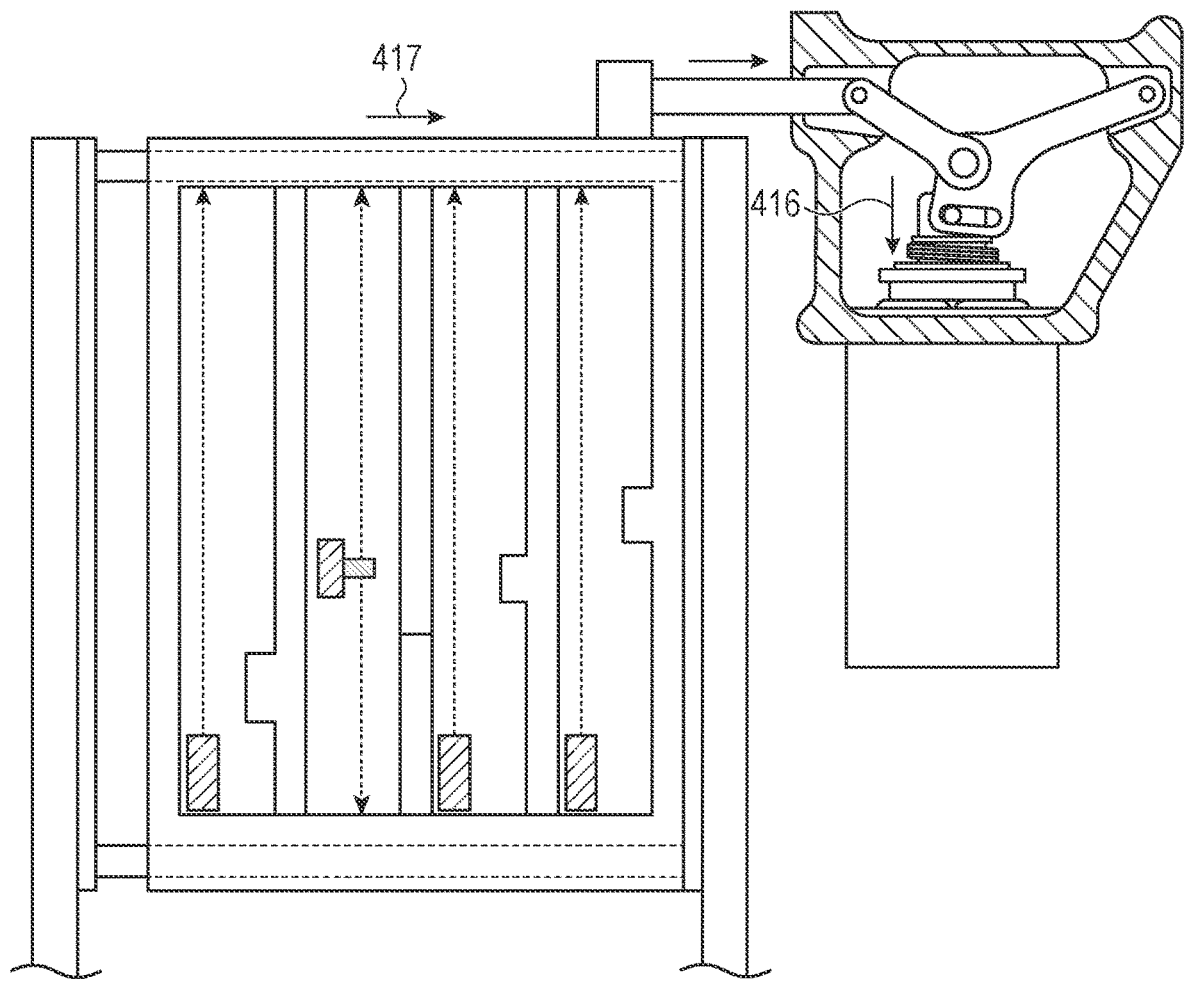

FIGS. 4A-4C illustrate an example detent actuation system 316 that is operative to engage and disengage the detent features. For example, the detent actuation system 316 may include an actuator 400 that is coupled to the movable detent assembly 320, and that can be actuated to move the movable detent assembly 320 between the engaged and disengaged configurations. The actuator 400 may receive signals and/or commands from a flight control system (e.g., the flight control system 140), and move the movable detent assembly 320 in accordance with the signals or command. The actuator 400 may be an electromagnetic actuator, electromechanical actuator, or use any other suitable actuation mechanisms.

As described above, the detent assembly 320 may be biased in an engaged configuration. The biasing force may be provided by the actuator and/or biasing mechanisms associated with the actuator (e.g., that provides the biasing force to the detent assembly 320 via the actuator). For example, as shown in FIG. 4A, the actuator 400 may include one or more springs (e.g., coil springs, such as spring 419) that bias the actuator in an unactuated state. In other examples, other types of biasing mechanisms may be included in the detent actuation system 316 to provide the biasing force instead of or in addition to the biasing mechanisms associated with the actuator (e.g., coil or other springs that act on link members of the detent actuation system 316 but are not coupled to or otherwise part of the actuator).

The springs may be positioned external to the actuator and/or inside an actuator housing. When the actuator 400 is in an actuated state, the actuator 400 may overcome the biasing force to move the movable detent assembly 320 to the disengaged configuration. In an unactuated state, the biasing force returns the actuator and the movable detent assembly 320 to the engaged configuration. This configuration may be used in aircraft that are designed to operate with an onboard pilot or crew, because the presence of the onboard operator means that the default or backup operating mode may be manual (e.g., onboard pilot) operation. In some cases, the actuator 400 may include a second actuated state in which the actuator applies a force that acts along with the biasing force to retain the movable detent assembly 320 in the engaged configuration.

In some cases, the movable detent assembly 320 may be biased in a disengaged configuration. In such cases, the actuator 400, when actuated, overcomes the biasing force and moves the movable detent assembly 320 to the engaged configuration. When the actuator is in the unactuated state, the biasing force returns the movable detent assembly 320 to the disengaged configuration.

FIG. 4A illustrates the selectively engageable detent system in the engaged configuration, with a piston 410 of the actuator applying a force (indicated by arrow 412) to move the movable detent assembly 320 into the engaged configuration (indicated by arrow 413). FIG. 4C illustrates the selectively engageable detent system in the disengaged configuration, with the actuator 400 having actuated a piston 410 (indicated by arrow 416) to move the movable detent assembly 320 into the disengaged configuration (indicated by arrow 417).

An actuation system may also include or define a locking system or locking mechanism that is configured to lock the selectively engageable detent features in the engaged position during a manual flight mode of the aircraft. For example, during aircraft operation, forces may be applied to the selectively engageable detents that tend to force the detents into a disengaged configuration. Such forces may be from impacts (e.g., a pilot accidentally bumping the flight control input assembly 300), forces from the levers themselves (e.g., the levers pushing on the detent features or a movable detent assembly), vibration, or the like. The locking system may help prevent such forces from disengaging the detent features during the manual flight modes.

In the example in FIGS. 4A-4C, the detent actuation system 316 has a self-locking configuration that mechanically locks the movable detent assembly 320 in the engaged configuration under certain operational conditions. For example, the detent actuation system 316 may include a mechanical linkage, including, for example, link members 406 and 408, that is positionable in an over-center configuration when the selectively engageable detent system is in the engaged configuration, or is otherwise configured so the actuation system cannot be overcome by forces applied to the detents or to the movable detent structure. For example, as shown in FIG. 4A and in FIG. 4B (showing an enlarged view of a portion of the detent actuation system 316), in the engaged configuration, the mechanical linkage (e.g., link members 406, 408) is positioned in an over-center configuration in which the axis 424 of the first link member 406 is angled relative to the axis 422 of the link member 408. In this configuration, a force that would tend to push the movable detent assembly 320 out of the engaged configuration (e.g., a force acting in the direction opposite the arrow 413) results in forces acting along the axes 424, 422. The angle between the axes 424, 422 causes the forces in the link members to produce a resultant force in the locking direction 428 (e.g., the pivot 409 is forced towards an actuator housing 411 or another hard stop, and not towards an unlocked configuration).

Notably, the self-locking configuration of the detent actuation system 316 is configured so that a disengaging force that is applied to the movable detent assembly 320 does not result in a force being applied to the actuator 400 that would tend to oppose the actuator. More particularly, the over-center configuration causes any disengaging force that is applied to the movable detent assembly 320 to apply a force to the mechanical linkage that acts in the same direction as the biasing force of the actuator 400. Thus, even if the actuator 400 were to experience a loss of power, the detent actuation system 316 would remain locked in the engaged configuration.

While FIGS. 4A-4C depict a self-locking mechanical linkage system, other locking mechanisms and/or systems may be used instead of or in addition to the described self-locking mechanical linkage system. For example, a detent actuation system may include a locking pin that can be selectively engaged or disengaged with the mechanical linkage to lock the mechanical linkage in a particular position (e.g., in which the detents are engaged). As another example, the actuator 400 may include an internal locking mechanism. As yet another example, a latch or pawl feature may selectively engage an engagement feature of the detent system to lock and unlock the detent system in a particular configuration.

As yet another example, self-locking may be facilitated by an asymmetrical mechanical advantage. For example, a rotating actuator may drive a threaded or geared mechanism (e.g., a worm gear or lead screw) to engage and disengage the movable detent assembly. The threaded or geared mechanism may resist back-drive, such that a disengaging force that is applied to the movable detent assembly does not back-drive the mechanism or actuator to forcibly disengage the movable detent assembly.

As noted above, the actuator 400 may be biased towards the locked configuration, such that the actuator 400 forces the mechanical linkage into the locked configuration even when it is in an unactuated state. Optionally, when the aircraft is in a manual flight mode, the actuator 400 remains actuated in an outward or engaged direction to supplement biasing forces (e.g., from a spring such as spring 419) and the self-locking geometry of the mechanical linkage. In some cases, biasing mechanisms, such as springs, may be coupled to the mechanical linkage instead of or in addition to the actuator. For example, a torsion spring may be provided at the pivot 409 between the link members 406, 408, that biases the link members into the locked configuration. As another example, one or more coil springs may bias one or more of the link members 406, 408 into the locked configuration.

The actuator 400 may be an electrically actuated actuator (e.g., a solenoid, a motor driven actuator), a pneumatic actuator, a hydraulic actuator, or any other suitable type of actuator. The actuator 400 may be considered to be in an actuated state when the actuator produces an actuation force in a certain direction. In some cases, such as in FIGS. 4A-4C, the actuation force opposes a biasing force. Thus, as shown in FIGS. 4A-4C, the actuator 400, in the actuated state, produces an actuation force acting in the direction 416 (FIG. 4C), which overcomes the biasing force produced by the spring 419 (and/or other biasing springs or biasing mechanism). When the actuator 400 is in the unactuated state, the spring 419 forces the piston 410 of the actuator 400 in the direction 412 (FIG. 4A). In some cases, the actuator 400 may have two actuated states: a first actuated state in which the actuator produces a first actuation force in a first direction (e.g., direction 416), and a second actuated state in which the actuator produces a second actuation force in a second direction (e.g., direction 412). In such cases, the actuator 400 may still be biased towards the second direction (e.g., via the spring 419), such that in a fully unactuated state, the linkage mechanism is still biased in the locked (e.g., over-center) configuration.

In examples where the actuator 400 is an electrically actuated actuator (e.g., a solenoid), the actuated state may correspond to an energized state (e.g., current is supplied to a solenoid coil), and the unactuated state may correspond to a deenergized state (e.g., no current is supplied to the solenoid coil). In examples where the actuator 400 is a hydraulically or pneumatically actuated actuator, the actuated state may correspond to a pressurized state (e.g., pressurized fluid is supplied to the actuator), and the unactuated state may correspond to a depressurized or neutral state (e.g., no pressurized fluid is supplied to the actuator).

FIGS. 4A-4C illustrate one example arrangement of an actuation system 316 and actuator 400, in which the actuation direction of the actuator 400 and the configuration of the mechanical linkages (and the configuration of the actuator housing 411) cooperate to move and lock the movable detent assembly 320 as described herein. However, other configurations are also possible. For example, the actuator may be configured so that its actuated state corresponds to an extension force (rather than the retraction force as shown in FIGS. 4A-4C), and the mechanical linkage may be configured so that the extension force disengages the movable detent assembly, and the retraction force (optionally aided by a biasing spring) engages and locks the movable detent assembly. Other configurations are also possible, including, for example, other types of actuators (e.g., rotational actuators), other linkage geometries, and the like.

FIGS. 3B-4C illustrate an example selectively engageable detent system in which multiple detents are coupled to or otherwise part of a single movable detent assembly. In other examples, separate actuation systems may be provided for detent systems of different control levers. For example, each support member may be separately movable and may be associated with its own actuation system, such that each support member (and thus its detent feature(s)) can be engaged or disengaged independently of other support members. In such cases, whether a particular detent is engaged or disengaged may depend on whether that system is under autonomous or manual operation. Thus, for example, if a propulsion system is being controlled autonomously but wing flaps and elevator trim are under manual control, the detents for the propulsion system may be disengaged (e.g., as commanded by the flight control system), and the detents for the wing flaps and elevator trim may be engaged (e.g., as commanded by the flight control system). In some cases, all detents are engaged unless a lever is being intentionally moved past the detent position by an actuator during autonomous flight modes.

Figure 5A:
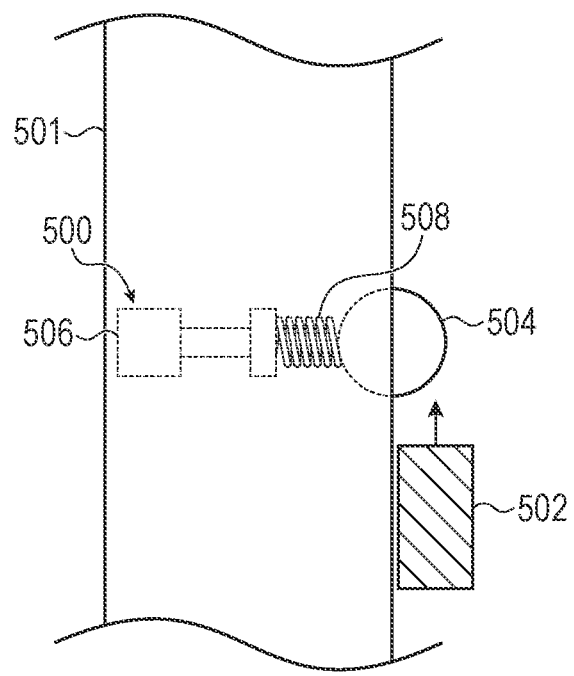
FIGS. 5A-5B depict portions of another example selectively engageable detent system.
Figure 5B:
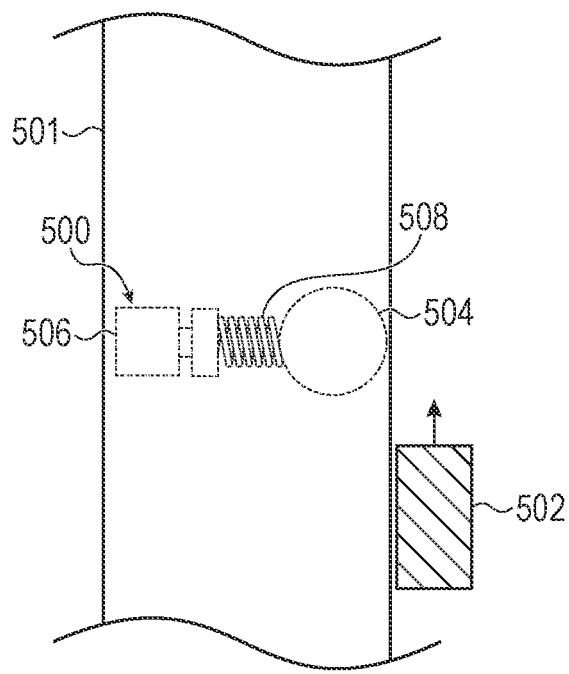

FIGS. 5A-5B illustrate another example selectively engageable detent system 500 that may be used with control levers (or other input structure) of an aircraft or other vehicle. The selectively engageable detent system 500 uses a ball detent to impede or block a lever 502 at a particular position along its lever path. The selectively engageable detent system 500 may be positioned in or coupled to a support member 501, which may correspond to or be an embodiment of the support members 319.

The selectively engageable detent system 500 includes a selectively engageable detent feature 504 (e.g., a ball, a member with a rounded protrusion) and a biasing spring 508. FIG. 5A illustrates the selectively engageable detent system 500 in the engaged configuration, in which the selectively engageable detent feature 504 is biased into the lever path by the biasing spring 508. The selectively engageable detent feature 504 may be configured to prevent the lever 502 from moving past the detent feature unless an operator bypasses the detent feature 504. An operator may bypass the detent feature by bending or deflecting the lever 502 to move the lever past the detent feature 504, or by actuating a mechanism to disengage the detent feature 504. In some cases, the operator can simply increase the force applied to the lever 502 along the lever path to overcome the biasing spring 508 and force the detent feature 504 out of the lever path.

An actuator 506 may be coupled to the biasing spring 508 and/or the detent feature 504 to selectively engage and disengage the selectively engageable detent feature. For example, as shown in FIG. 5A, the actuator 506 may position the detent feature 504 in the lever path to provide the detent functionality. As shown in FIG. 5B, the actuator may retract the detent feature 504 and optionally the biasing spring 508 so that it is no longer in the lever path. As described with respect to other selectively engageable detent systems, the actuator 506 may receive signals from a flight control system (e.g., the flight control system 140) to engage the ball detent system during manual flight modes and disengage the ball detent system during autonomous flight modes (e.g., while an actuator is moving the lever past the detent position during autonomous flight modes).

Figure 6A:
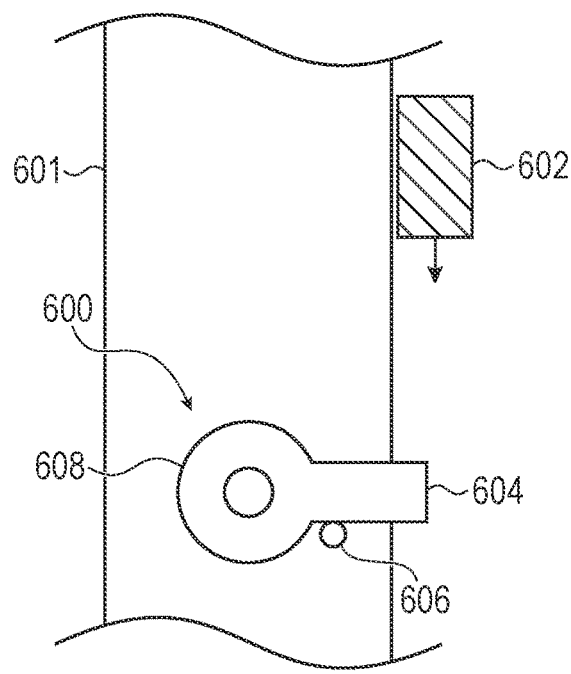
FIGS. 6A-6B depict portions of another example selectively engageable detent system.
Figure 6B:
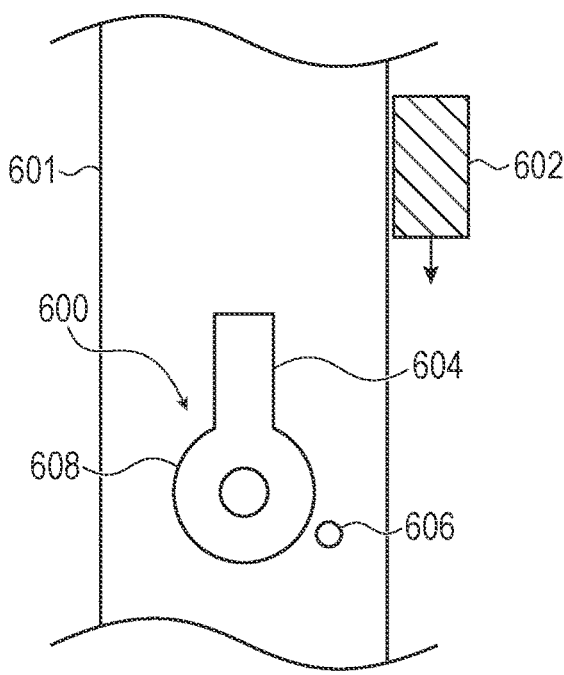

FIGS. 6A-6B illustrate another example selectively engageable detent system 600 that may be used with control levers (or other input structure) of an aircraft or other vehicle. The selectively engageable detent system 600 may be positioned in or coupled to a support member 601, which may correspond to or be an embodiment of the support members 319.

The selectively engageable detent system 600 uses a rotatable member 608 that includes a selectively engageable detent feature 604 (e.g., a tab of the rotatable member 608) that can be positioned in the lever path (e.g., an engaged configuration, FIG. 6A) or rotated out of the lever path (e.g., a disengaged configuration, FIG. 6B). The selectively engageable detent system 600 may include an actuator coupled to the rotatable member 608 that receives signals from a flight control system (e.g., the flight control system 140) to rotate the detent feature 604 of the rotatable member 608 into the lever path during manual flight modes, and rotate the rotatable member 608 out of the lever path during autonomous flight modes (e.g., while an actuator is moving the lever past the detent position during autonomous flight modes). In some cases, the selectively engageable detent system 600 includes a travel limiting feature 606. The travel limiting feature 606 may provide a hard stop for the rotatable member 608 to increase the resistance of the rotatable member 608 to forces applied by the lever 602.

The travel limiting feature 606 and the direction of rotation of the rotatable member 608 may be configured based on the direction in which the lever 602 is most likely to contact the detent feature 604 during flight (and based on the direction in which it is most important to restrict motion of the lever 602). For example, if the lever 602 controls propeller pitch, and the position below the selectively engageable detent system 600 (as depicted in FIGS. 6A-6B) correspond to a fully feathered propeller (e.g., producing no thrust), the travel limiting feature 606 can physically prevent or inhibit the rotatable member 608 from being forced out of the way by the lever 602. In some cases, additional travel limiting features may be provided to physically inhibit rotation of the rotatable member 608. The travel limiting features may be retractable to selectively allow or inhibit rotation of the rotatable member 608.

The selectively engageable detent systems shown and described with respect to FIGS. 5A-6B may be independently controllable, thus allowing the detent systems for individual control levers to be engaged or disengaged independently of other control levers.

Figure 7A:
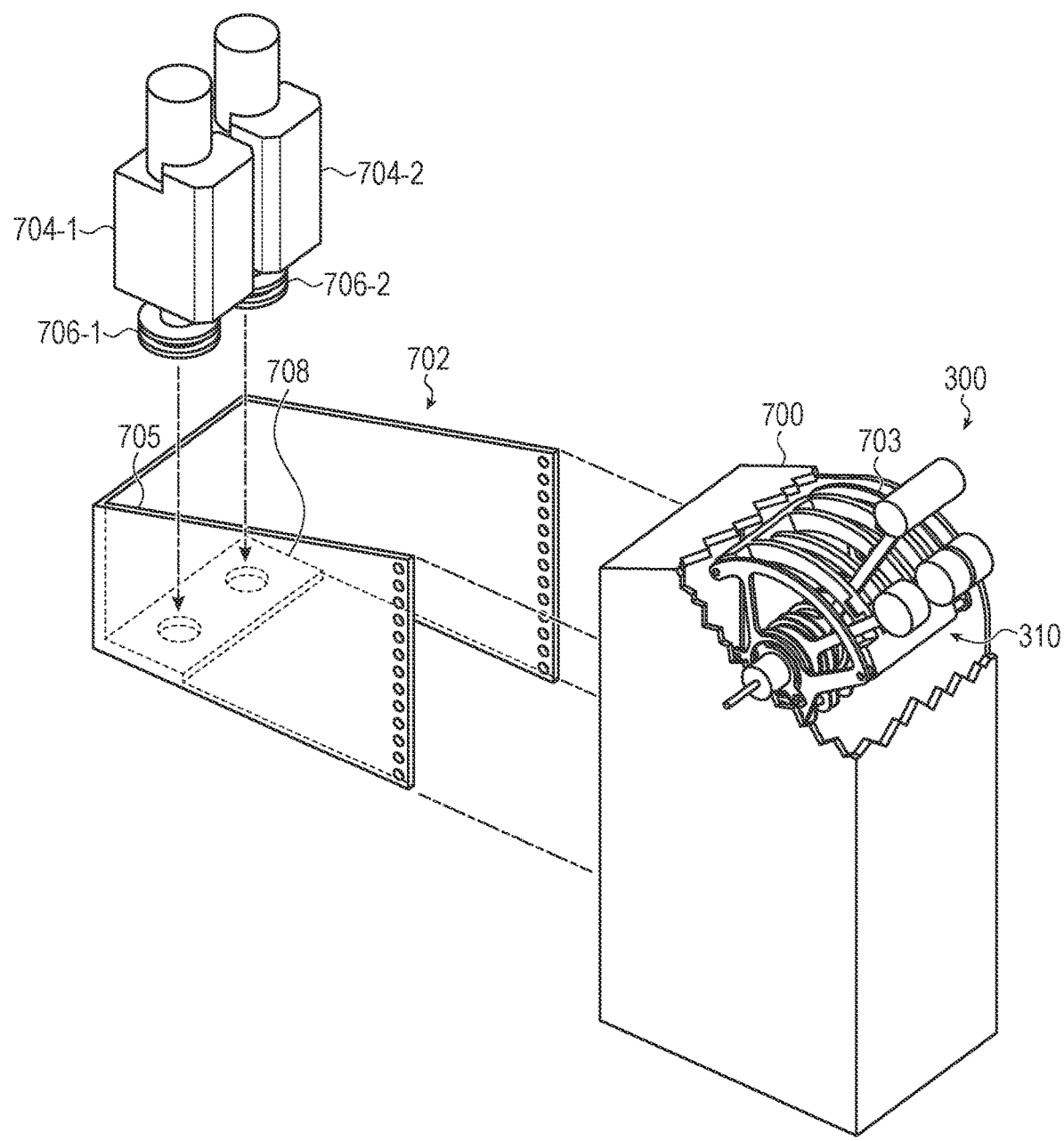
FIGS. 7A-7C depict example portions of an aircraft with automatic lever control systems.
Figure 7B:
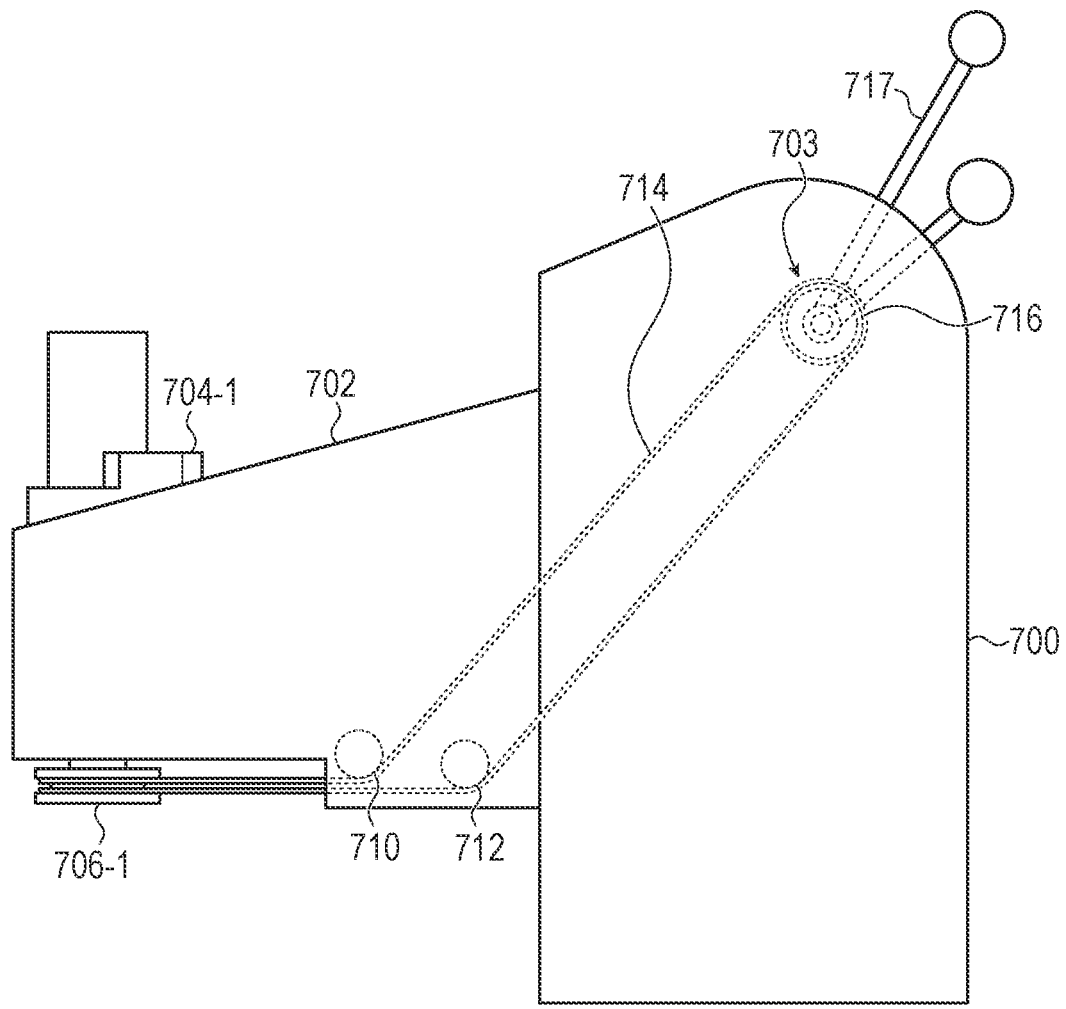
Figure 7C:
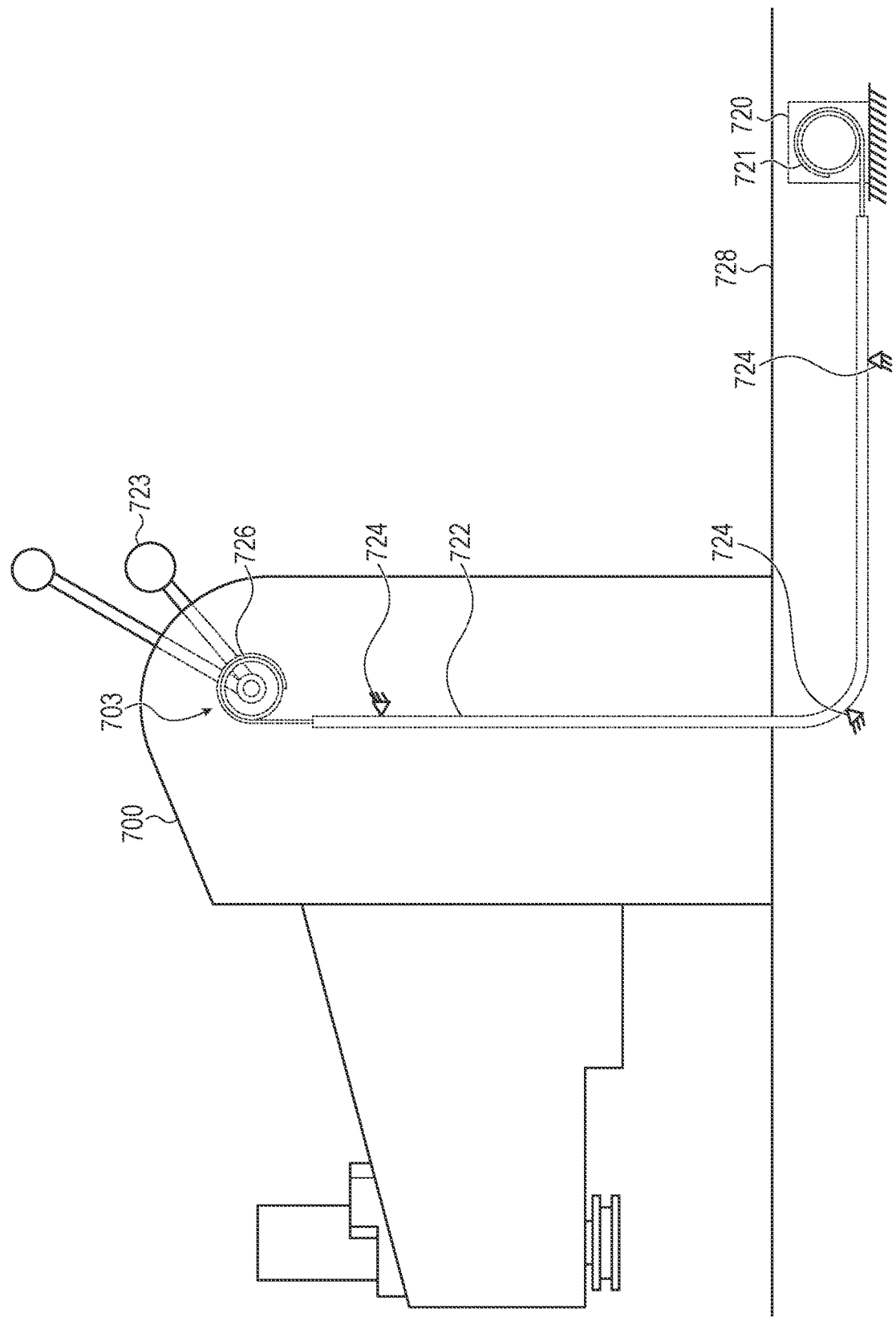

FIGS. 7A-7C illustrate an example technique for integrating features such as automatic control lever operation (e.g., for autonomous operation modes) and selectively engageable detent systems in an aircraft that is also configured for manual operation modes. In some cases, the systems and mechanisms for automatic control lever operation and/or selectively engageable detent systems may be retrofitted to an existing aircraft (e.g., one that is already built and configured for manual operation), or in other cases they may be integrated into an aircraft as original equipment.

FIG. 7A illustrates an example configuration for integrating an automatic control lever system into a flight control input assembly 300 of an aircraft. The automatic control lever system may include a motor mount structure 702 that receives one or more actuation motors 704 (e.g., 704-1, 704-2). The actuation motors 704 may be configured to move a control lever using a cable, linkage, or another actuation system. The actuation motors 704 may receive signals or commands from an aircraft controller (and/or a motor controller associated with the aircraft controller) and move the control levers in accordance with the received signals. The actuation motors 704 may move the control levers via cables, gear trains, direct drives, mechanical linkages, or any other suitable technique. For example, the actuation motors 704 may move a cable using output pulleys 706 (e.g., 706-1, 706-2). In some cases, actuators (e.g., linear actuators) may be used instead of or in addition to rotating motors. In the example of FIG. 7A, the actuation motors 704 may move the levers via a cable system that extends between the actuation motors 704 and a control lever assembly 703.

The motor mount structure 702 may be coupled to a pedestal structure 700. The motor mount structure 702 may define or include a mounting plate 708 to which the actuation motors 704 may be attached. The mounting plate 708 may position the shafts of the actuation motors 704 in a position relative to the pedestal structure 700 such that a cable path can be defined from the shafts to the control lever assembly 703. The motor mount structure 702 may define a shroud 705 or other structural member that is coupled to the pedestal structure 700 and structurally supports the mounting plate 708 and the actuation motors 704 in position. The shroud 705 may be attached to the pedestal structure 700 via fasteners (e.g., bolts, rivets, screws, etc.), welds, and/or other attachment techniques. In some cases, the motor mount structure 702 is configured for nondestructive removal from the pedestal structure 700, to allow the automatic control lever system to be removed from the aircraft if desired (e.g., it may be attached via removable fasteners such as bolts and/or screws).

In cases where an existing aircraft is being retrofitted to include an automatic lever control system, the pedestal structure 700 may be an existing component of the aircraft, and the motor mount structure 702 may be configured to mount to the existing structure. In such cases, the motor mount structure 702 may be configured to fit onto the pedestal structure 700 in a volume within the aircraft that is otherwise unoccupied. For example, the motor mount structure 702 may be mounted on a forward side of the pedestal structure 700 and may extend at least partially under an instrument panel in the cockpit (e.g., the instrument panel 201, FIG. 2A). In some cases, the motor mount structure 702 is positioned between the instrument panel and the pedestal structure 700 of an aircraft.

In order to facilitate both autonomous and manual control modes, the flight control input assembly 300 may also include a control lever assembly 703 that accepts manual inputs and is interconnected with automated actuation systems. For example, the control lever assembly 703 may include control levers for controlling aircraft systems (e.g., propulsion systems, flight control surfaces, wing flaps, airbrakes, etc.), as well as mechanisms for supporting the control levers and for coupling the control levers to the aircraft systems themselves (e.g., via mechanical linkages). The control lever assembly 703 may also include or be coupled to a selectively engageable detent system, such as the selectively engageable detent system 310. As described herein, the selectively engageable detent system 310 may engage one or more detent features when the levers are under manual operation, and they may disengage one or more detent features when the levers are under autonomous operation (e.g., when they are being actuated by the actuation motors 704).

FIG. 7B illustrates an example technique for operatively coupling the actuation motors 704 to the control lever assembly 703 via a cable system. For example, an actuation motor 704-1 may be coupled to an output pulley 706-1, and a cable 714 may be routed from the output pulley 706-1 to an input pulley 716 that is coupled to or otherwise controls a lever 717 of the control lever assembly 703. The cable 714 may be routed through a portion of the motor mount structure 702 and the pedestal structure 700, and may be guided by one or more guide pulleys 710, 712. The cable actuation system may be configured as a closed-loop cable in which actuation of the lever in either direction is produced by a tensile force applied to the cable loop. For example, the cable 714 may be fixed to either or both of the output pulley 706-1 and the input pulley 716. Thus, when the output pulley 706-1 is rotated by the actuation motor 704-1 in a first direction, one side of the cable loop is under tension, which causes the input pulley 716 to be rotated in a first direction (which in turn causes the associated lever 717 to be moved in a first direction along its lever path). When the output pulley 706-1 is rotated by the actuation motor 704-1 in a second direction opposite to the first direction, the other side of the cable loop is under tension, which causes the input pulley 716 to be rotated in a second direction opposite the first direction (which in turn causes the associated lever 717 to be moved in a second, opposite direction along its lever path).

The closed-loop cable actuation system described with respect FIG. 7B may have low-backlash and may provide high accuracy lever actuation. In some cases, the cable 714 is pre-tensioned, which may improve the accuracy and precision of the system. In some cases, the cable tension results in a tight coupling between the cable 714 and one or both of the output pulley 706-1 and the input pulley 716 (e.g., the cable 714 is tightly wrapped around the pulley, such that pulley rotations are translated directly to the cable 714, and vice versa, with minimal backlash). In some cases, a cable tensioning device is used to establish and maintain a desired cable tension. For example, the cable 714 may include a turnbuckle that allows the cable tension to be controlled.

The cable-actuated automatic lever control system illustrated in FIG. 7B couples the actuation motors 704 directly to the control lever assembly, such that the cable actuation system essentially replicates human input to the control levers. In this way, the automatic lever control system can be more easily integrated with an aircraft (either as a retrofit or as original equipment), because it can utilize the systems and mechanisms that already exist for linking operator inputs to the actual aircraft systems. For example, instead of creating an additional mechanical coupling to an engine in parallel with an engine control lever, the actuation motors can operate the engine control lever itself, thereby simplifying design, installation, and maintenance, and optionally avoiding the need to validate new flight control systems.

FIG. 7B illustrates one example cable routing arrangement from the actuation motors 704 to the control lever assembly 703. In other examples, other cable routing arrangements may be used. For example, more or fewer guide pulleys may be used.

FIG. 7C illustrates another example cable actuation system that may be integrated with an aircraft, either as original equipment or as a retrofit, to control a system of the aircraft via a control lever assembly 703. The cable actuation system shown in FIG. 7C may use a push-pull cable configuration. In some cases, a push-pull cable configuration includes a single cable or wire routed through a cable housing. The single cable may be pulled or pushed through the cable housing to actuate a lever 723 of the control lever assembly 703. This may eliminate the need for rotating guide pulleys along the lever path, as the cable housing provides the guiding function for the actuation cable and can be held in place by static attachment systems (e.g., brackets, clamps, etc.).

In the example in FIG. 7C, an actuation motor 720 may be mounted in the aircraft. The actuation motor 720 may include an output pulley 721, and it may be coupled to a push-pull cable system (or simply cable) 722. The cable 722 may be coupled to an input pulley 726 of the control lever assembly 703 to actuate a lever 723. The cable 722 may be secured in place at mounting points 724 (e.g., via brackets, straps, clamps, etc.).

Because the cable actuation system in FIG. 7C uses only a single cable run for a given control lever, there is a large degree of flexibility in where the actuation motor 720 may be positioned. In particular, the motor 720 may be mounted anywhere within the aircraft so long as a cable of suitable length can be connected from the control lever assembly 703 to the motor 720. As shown in FIG. 7C, the motor 720 may be mounted below a floor 728 of the aircraft, and the cable 722 may be routed below the floor and through the pedestal structure 700.

The cable actuation systems shown in FIGS. 7B-7C include cables that are actuated using rotating actuation motors, though this is merely one example system for integrating automatic lever actuation with a control lever assembly and/or a system of the aircraft. In another example, direct-drive motors may be coupled to a control lever assembly to actuate the levers (and thus the connected aircraft system) during autonomous operation. In yet another example, a linear actuator (e.g., electromechanical, hydraulic, pneumatic, etc.) may be coupled to a control lever assembly to actuate the levers. Further, such mechanisms may be coupled to the aircraft system components directly, rather than to the control lever assembly. For example, a cable system, linear actuator, direct-drive motor, or the like, may be coupled to a mechanical linkage that connects a control lever to an aircraft system such as an engine, flight control surface, or the like.

Figure 8:
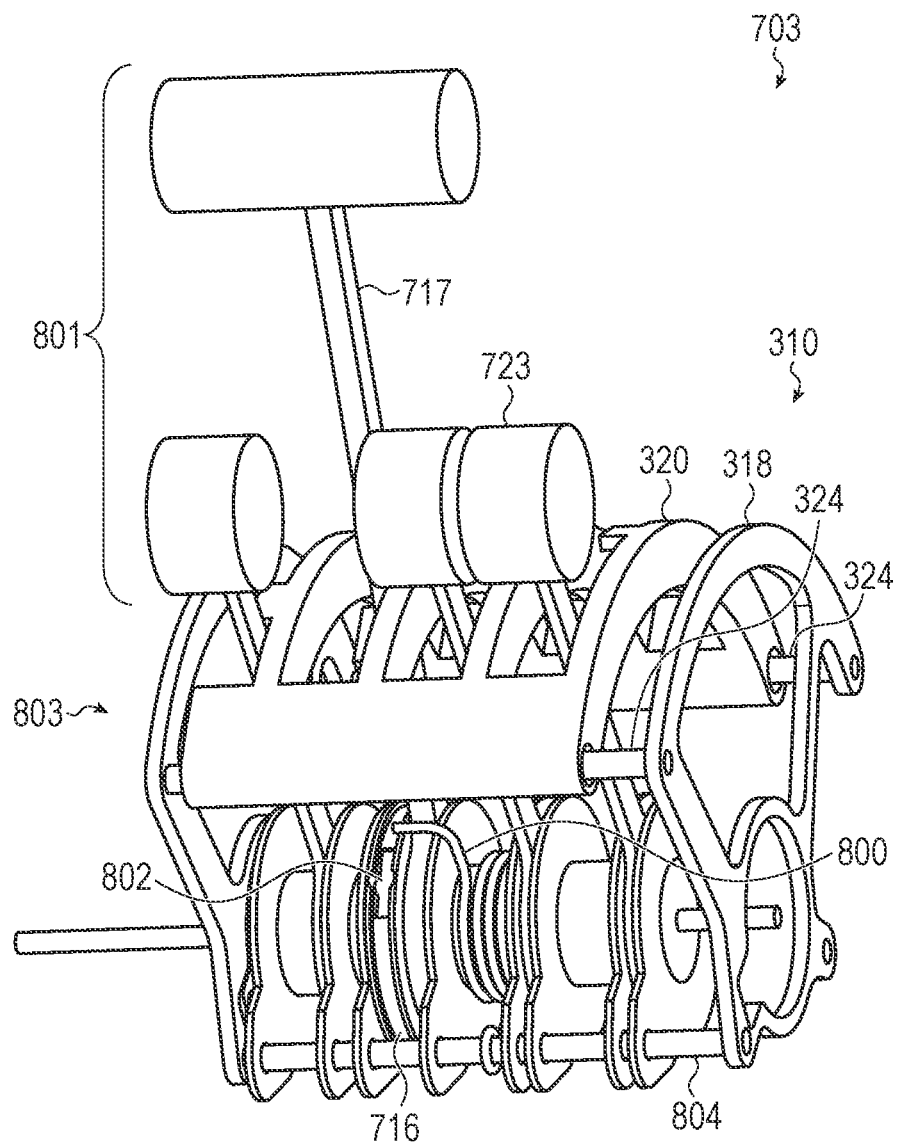
FIG. 8 depicts an example control lever assembly.

FIG. 8 illustrates an example control lever assembly 703. The control lever assembly 703 includes a base structure 803 and control levers 801 (which may include the control levers 717, 723, FIGS. 7B-7C) coupled to the base structure and movable along lever paths. The control lever assembly 703 may include the movable detent assembly 320, which is configured to move relative to a static member 318 by sliding along rails 324, as described herein. In other examples, the control lever assembly 703 includes or is coupled to a different example of a selectively engageable detent system, such as those shown in FIGS. 5A-6B. The control lever assembly 703 may also include or be coupled to an actuation system that selectively engages and disengages the detent features (e.g., the actuation system 316, FIG. 4A-4C).

The control lever assembly 703 may also include springs that provide a biasing force to the control levers. For example, a spring 800 may be coupled to a static support 804 and also contact the control lever 717. The spring 800 may impart a force to the lever 717 that helps overcome or neutralize a mechanical bias in the system that a pilot (and/or an automatic control lever system) would otherwise need to overcome. In cases where an automatic control lever system is added to an aircraft as a retrofit system, the spring 800 may be used as a replacement for a different spring, which may be removed in order to accommodate a selectively engageable detent system.

FIG. 8 also illustrates the input pulley 716, which may be coupled to the control lever 717 to transfer actuation forces from a cable system to the control lever 717. The input pulley 716 may include a receptacle 802 that interlocks with a corresponding cable feature to securely attach the cable to the input pulley 716 and transfer cable forces to the input pulley 716. For example, the receptacle 802 may be configured to receive a ball feature that is attached to the cable. The ball feature may interlock with the receptacle 802 such that cable forces applied in either rotational direction of the input pulley 716 are directly transferred to the input pulley 716. While FIG. 8 illustrates one example spring 800 and input pulley 716, it will be understood that any of the control levers of the control lever assembly 703 may include similar springs and pulleys to provide the same functions for those control levers.

In cases where an automatic control lever system is added to an aircraft as a retrofit system, the control lever assembly 703 may replace an existing control lever assembly. For example, an existing control lever assembly may be removed, and the control lever assembly 703 illustrated in FIG. 8 may be incorporated into the aircraft in its place. Alternatively, portions of an existing control lever assembly may be retained, and some components and/or systems shown in the control lever assembly 703 in FIG. 8 may be incorporated into the existing mechanisms. For example, in some cases, the selectively engageable detent system 310 may be added to an existing control lever assembly 703. In such cases, an existing fixed detent system may be removed to avoid interfering with the operation of the selectively engageable detent system and the automatic lever operation. Similarly, input pulleys and springs may be incorporated with existing structures of a lever assembly.

FIG. 9 illustrates a sample electrical block diagram of an electronic device 900 that may perform the operations described herein. The electronic device 900 may in some cases take the form of any of the electronic devices described with reference to FIGS. 1A-2A, including any computing systems, client devices, servers, or other computing devices associated with the system 100 (e.g., the computing system on board the aircraft, instruments, aircraft avionics, the terminal device operated by the remote client, and/or other systems and/or devices for implementing the techniques described herein). For example, the electronic device 900 may instantiate all or part of a flight control system, such as the flight control system 140. The electronic device 900 can include one or more of a display 908, a processing unit 902, a power source 912, a memory 904 or storage device, input devices 906, and output devices 910. In some cases, various implementations of the electronic device 900 may lack some or all of these components and/or include additional or alternative components.

The processing unit 902 can control some or all of the operations of the electronic device 900. The processing unit 902 can communicate, either directly or indirectly, with some or all of the components of the electronic device 900. For example, a system bus or other communication mechanism 914 can provide communication between the processing unit 902, the power source 912, the memory 904, the input device(s) 906, and the output device(s) 910.

The processing unit 902 can be implemented as any electronic device capable of processing, receiving, or transmitting data or instructions. For example, the processing unit 902 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 900 can be controlled by multiple processing units. For example, select components of the electronic device 900 (e.g., an input device 906) may be controlled by a first processing unit and other components of the electronic device 900 (e.g., the display 908) may be controlled by a second processing unit, where the first and second processing units may or may not be in communication with each other.

The power source 912 can be implemented with any device capable of providing energy to the electronic device 900. For example, the power source 912 may be one or more batteries or rechargeable batteries. Additionally, or alternatively, the power source 912 can be a power connector or power cord that connects the electronic device 900 to another power source, such as a wall outlet, an auxiliary power unit, or a power system of the aircraft.

The memory 904 can store electronic data that can be used by the electronic device 900. For example, the memory 904 can store electronic data or content such as, for example, audio files, video files, voice communication packets, documents and applications, device settings and user preferences, computer instructions, timing signals, control signals, and data structures or databases. The memory 904 can be configured as any type of memory. By way of example only, the memory 904 can be implemented as random access memory, read-only memory, Flash memory, removable memory, other types of storage elements, or combinations of such devices.

In various embodiments, the display 908 provides a graphical output, for example associated with an operating system, user interface, and/or applications of the electronic device 900. For example, the display 908 may display graphical user interfaces associated with the system 100 and/or the aircraft 102, including, but not limited to, a graphical interface associated with terminal device 104, the on-board computing system 103 of the aircraft, aircraft avionics displays, or any other graphical user interfaces or other graphical outputs described herein). In one embodiment, the display 908 includes one or more sensors and is configured as a touch-sensitive (e.g., single-touch, multi-touch) and/or force-sensitive display to receive inputs from a user. For example, the display 908 may be integrated with a touch sensor (e.g., a capacitive touch sensor) and/or a force sensor to provide a touch- and/or force-sensitive display. The display 908 is operably coupled to the processing unit 902 of the electronic device 900. Additionally, or alternatively, the display 908 may include one or more bezel buttons or other input devices that are arranged along the perimeter of the viewable display area.

The display 908 can be implemented with any suitable technology, including, but not limited to, liquid crystal display (LCD) technology, light emitting diode (LED) technology, organic light-emitting display (OLED) technology, organic electroluminescence (OEL) technology, or another type of display technology.

In various embodiments, the input devices 906 may include any suitable components for detecting inputs. In the context of the terminal device 104, for example, the input device 906 may include a keyboard, mouse, trackpad, touchscreen, or other similar type of input device configured to receive typing, cursor control, or other user input. In some cases, a separate tablet or other portable electronic device may include a touch screen or touch sensor that can be adapted for use as an input device 906 for the device 900. In the context of an on-board computing system of an aircraft, the input devices 906 may include touchscreen displays, buttons, switches, levers, or the like. Other examples of input devices 906 include, without limitation, light sensors, temperature sensors, audio sensors (e.g., microphones), optical or visual sensors (e.g., cameras, visible light sensors, or invisible light sensors), proximity sensors, touch sensors, force sensors, mechanical devices (e.g., switches, buttons, or keys), airspeed sensors, altimeters, accelerometers, tilt sensors, radar sensors, LiDAR sensors, vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, or electrodes. Each input device 906 may be configured to detect one or more particular types of input and provide a signal (e.g., an input signal) corresponding to the detected input. The signal may be provided, for example, to the processing unit 902.

As discussed above, in some cases, the input device(s) 906 include a touch sensor (e.g., a capacitive touch sensor) integrated with the display 908 to provide a touch-sensitive display. Similarly, in some cases, the input device(s) 906 include a force sensor (e.g., a capacitive force sensor) integrated with the display 908 to provide a force-sensitive display. Additionally, or alternatively, the input device(s) 906 may include a separate trackpad, mouse, tablet, or other device configured to receive touch and/or force input from the user.

The output devices 910 may include any suitable components for providing outputs. Examples of output devices 910 include, without limitation, light emitters, audio output devices (e.g., speakers), visual output devices (e.g., lights or displays), tactile output devices (e.g., haptic output devices), gauges, dials, avionics display screens, and communication devices (e.g., wired or wireless communication devices). Each output device 910 may be configured to receive one or more signals (e.g., an output signal provided by the processing unit 902) and provide an output corresponding to the signal.

In some cases, input devices 906 and output devices 910 are implemented together as a single device. For example, an input/output device or port can transmit electronic signals via a communications network, such as a wireless and/or wired network connection. Examples of wireless and wired network connections include, but are not limited to, the example communication systems described herein and include, without limitation, satellite communication systems, cellular systems, Wi-Fi, Bluetooth, IR, or Ethernet connections.

The processing unit 902 may be operably coupled to the input devices 906 and the output devices 910. The processing unit 902 may be adapted to exchange signals with the input devices 906 and the output devices 910. For example, the processing unit 902 may receive an input signal from an input device 906 that corresponds to an input detected by the input device 906. The processing unit 902 may interpret the received input signal to determine whether to provide and/or change one or more outputs in response to the input signal. The processing unit 902 may then send an output signal to one or more of the output devices 910, to provide and/or change outputs as appropriate.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

What is claimed is:

1. An aircraft, comprising:
a control lever movable along a lever path and configured to control a system of the aircraft during a manual flight mode of the aircraft and during an at least partially autonomous flight mode of the aircraft;
a selectively engageable detent feature configured to inhibit travel of the control lever and operable in:
a disengaged configuration in which the control lever is movable along the lever path without restriction by the selectively engageable detent feature; and
an engaged configuration in which the selectively engageable detent feature inhibits travel of the control lever at a particular location along the lever path;
a detent actuator configured to move the selectively engageable detent feature between the engaged configuration and the disengaged configuration, wherein:
the detent actuator has a first state and a second state;
in the first state, the detent actuator overcomes a biasing force to move the selectively engageable detent feature to the disengaged configuration; and
in the second state, the biasing force biases the selectively engageable detent feature in the engaged configuration; and
a flight control system configured to:
cause the detent actuator to move the selectively engageable detent feature into the engaged configuration for operation of the control lever during the manual flight mode of the aircraft; and
cause the detent actuator to move the selectively engageable detent feature into the disengaged configuration for operation of the control lever during the at least partially autonomous flight mode of the aircraft.

2. The aircraft of claim 1, wherein:
when moving from the disengaged configuration to the engaged configuration, the selectively engageable detent feature translates in a first direction transverse to the lever path, thereby moving at least a portion of the selectively engageable detent feature into the lever path to block the control lever at the particular location along the lever path; and
when moving from the engaged configuration to the disengaged configuration, the selectively engageable detent feature translates in a second direction opposite the first direction, thereby removing the selectively engageable detent feature from the lever path.

3. The aircraft of claim 2, wherein the aircraft further comprises a self-locking detent actuation mechanism configured to:
translate the selectively engageable detent feature in the first direction and the second direction to engage and disengage the selectively engageable detent feature, respectively; and
lock the selectively engageable detent feature in the engaged configuration during the manual flight mode of the aircraft.

4. The aircraft of claim 3, wherein:
the self-locking detent actuation mechanism comprises a mechanical linkage positionable in an over-center configuration; and
the selectively engageable detent feature is locked in the engaged configuration when the mechanical linkage is positioned in the over-center configuration.

5. The aircraft of claim 1, wherein:
the aircraft further comprises a lever actuation system configured to move the control lever along the lever path in response to a command from the flight control system; and
the flight control system is configured to move the selectively engageable detent feature to the disengaged configuration during the at least partially autonomous flight mode in response to an instruction to move the control lever, with the lever actuation system, past the particular location along the lever path.

6. The aircraft of claim 5, wherein the flight control system is configured to cause the lever actuation system to move the control lever during the at least partially autonomous flight mode in order to control the system of the aircraft in response to an instruction received from a remote operator of the aircraft.

7. An input assembly for a vehicle, comprising:
a control lever movable along a lever path and configured to control a system of the vehicle, the control lever configured to be moved by a user when the input assembly is operated in a manual operation mode;
an actuation system configured to move the control lever along the lever path when the input assembly is operated in an automatic operation mode, thereby controlling the system of the vehicle during the automatic operation mode;
a selectively engageable detent feature configured to inhibit travel of the control lever when the selectively engageable detent feature is in an engaged configuration;
a biasing spring; and
an actuator configured to:
engage the selectively engageable detent feature for operation of the input assembly in the manual operation mode; and
disengage the selectively engageable detent feature for operation of the input assembly in the automatic operation mode, wherein
the actuator has a first state and a second state;
in the first state, the actuator overcomes the biasing spring to disengage the selectively engageable detent feature; and
in the second state, the biasing spring engages the selectively engageable detent feature.

8. The input assembly of claim 7, wherein:
the input assembly further comprises a movable detent assembly;
the movable detent assembly includes the selectively engageable detent feature; and
the actuator moves the movable detent assembly from a first position in which the selectively engageable detent feature is engaged to a second position in which the selectively engageable detent feature is disengaged.

9. The input assembly of claim 8, further comprising a locking mechanism configured to lock the movable detent assembly in the first position during the manual operation mode of the input assembly.

10. The input assembly of claim 7, wherein:
the control lever is a first control lever;
the lever path is a first lever path;
the system of the vehicle is a first system of the vehicle;
the selectively engageable detent feature is a first selectively engageable detent feature; and
the input assembly further comprises:
a second control lever movable along a second lever path and configured to control a second system of the vehicle; and
a second selectively engageable detent feature configured to inhibit travel of the second control lever when the second selectively engageable detent feature is in an engaged configuration.

11. The input assembly of claim 10, wherein:
the first and second selectively engageable detent features are defined by a unitary detent assembly; and
the actuator is configured to:
translate the unitary detent assembly in a first direction to simultaneously engage the first and second selectively engageable detent features for operation of the input assembly in the manual operation mode; and
translate the unitary detent assembly in a second direction opposite the first direction to simultaneously disengage the first and second selectively engageable detent features for operation of the input assembly in the automatic operation mode.

12. The input assembly of claim 7, wherein movement of the control lever along the lever path controls a thrust of the vehicle.

13. A throttle quadrant comprising:
a base structure;
a thrust control lever coupled to the base structure and movable along a first lever path;
a flight control surface lever coupled to the base structure and movable along a second lever path;
a movable detent assembly movable between an engaged position and a disengaged position and comprising:
a first support member;
a second support member;
a first detent feature extending from the first support member, the first detent feature:
positioned in the first lever path to block the thrust control lever at a particular location along the first lever path when the movable detent assembly is in the engaged position; and
not positioned in the first lever path when the movable detent assembly is in the disengaged position; and
a second detent feature extending from the second support member, the second detent feature:
positioned in the second lever path to block the flight control surface lever at a particular location along the second lever path when the movable detent assembly is in the engaged position; and
not positioned in the second lever path when the movable detent assembly is in the disengaged position; and an actuator configured to move the movable detent assembly between the engaged position the disengaged position.

14. The throttle quadrant of claim 13, wherein:
the movable detent assembly is biased in the engaged position; and
the actuator is configured to overcome the bias to move the movable detent assembly to the disengaged position.

15. The throttle quadrant of claim 13, wherein the movable detent assembly is biased in the disengaged position.

16. The throttle quadrant of claim 13, wherein:
the thrust control lever is configured to control a propeller blade angle; and
the flight control surface lever is configured to control a flap deployment level.

17. The throttle quadrant of claim 13, wherein the movable detent assembly is a unitary structure defining the first support member, the second support member, the first detent feature, and the second detent feature.

18. The throttle quadrant of claim 13, further comprising a self-locking linkage coupling the actuator to the movable detent assembly, the self-locking linkage positionable in an over-center configuration that locks the movable detent assembly in the engaged position when the actuator is in an unactuated state.

19. An aircraft, comprising:
a control lever movable along a lever path and configured to control a system of the aircraft during a manual flight mode of the aircraft and during an at least partially autonomous flight mode of the aircraft;
a selectively engageable detent feature configured to inhibit travel of the control lever and operable in:
a disengaged configuration in which the control lever is movable along the lever path without restriction by the selectively engageable detent feature; and
an engaged configuration in which the selectively engageable detent feature inhibits travel of the control lever at a particular location along the lever path;
a self-locking detent actuation mechanism configured to lock the selectively engageable detent feature in the engaged configuration during the manual flight mode of the aircraft, wherein:
the self-locking detent actuation mechanism comprises a mechanical linkage positionable in an over-center configuration; and
the selectively engageable detent feature is locked in the engaged configuration when the mechanical linkage is positioned in the over-center configuration; and
a flight control system configured to:
cause a detent actuator to move the selectively engageable detent feature into the engaged configuration for operation of the control lever during the manual flight mode of the aircraft; and
cause the detent actuator to move the selectively engageable detent feature into the disengaged configuration for operation of the control lever during the at least partially autonomous flight mode of the aircraft.

20. The aircraft of claim 19, further comprising a detent actuator configured to move the selectively engageable detent feature between the engaged configuration and the disengaged configuration, wherein:
the detent actuator comprises a first state and a second state;
the detent actuator is biased in the second state;
when the detent actuator is in the second state, the selectively engageable detent feature is in the engaged configuration;
when the detent actuator is in the first state, the selectively engageable detent feature is in the disengaged configuration; and
when the detent actuator moves from the second state to the first state, the detent actuator overcomes the bias to move the selectively engageable detent feature to the disengaged configuration.

* * * * *